United States Patent
Molin et al.

(10) Patent No.: US 10,755,121 B2
(45) Date of Patent: Aug. 25, 2020

(54) DRIVING ORIENTED DIGITAL VIDEO RECORDER SYSTEM

(71) Applicant: Bendix Commercial Vehicle Systems LLC, Elyria, OH (US)

(72) Inventors: Hans M. Molin, Mission Viejo, CA (US); Andreas U. Kuehnle, Villa Park, CA (US); Brendan Buzer, Laguna Beach, CA (US); Reza Khamsi, Mission Viejo, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/182,678

(22) Filed: Nov. 7, 2018

(65) Prior Publication Data

US 2019/0147259 A1 May 16, 2019

Related U.S. Application Data

(63) Continuation of application No. 15/810,077, filed on Nov. 12, 2017.

(51) Int. Cl.
*G06K 9/00* (2006.01)
*H04N 21/44* (2011.01)
(Continued)

(52) U.S. Cl.
CPC ....... *G06K 9/00825* (2013.01); *G06F 16/743* (2019.01); *G06F 16/783* (2019.01);
(Continued)

(58) Field of Classification Search
None
See application file for complete search history.

(56) References Cited

U.S. PATENT DOCUMENTS 10,204,159 B2  2/2019 Angel et al.
2012/0173577 A1* 7/2012 Millar ............... G06F 16/7837
707/780

(Continued)

FOREIGN PATENT DOCUMENTS

EP     2866230    4/2015
WO  2004036926    4/2004

OTHER PUBLICATIONS

International Search Report and Written Opinion corresponding to PCT/US2018/059793, dated Feb. 12, 2018, 12 pages.

*Primary Examiner* — Delomia L Gilliard
(74) *Attorney, Agent, or Firm* — Tucker Ellis LLP

(57) ABSTRACT

A driving oriented digital video recorder (DVR) system may comprise a camera; a memory; and a control circuit. The occurrence of a predefined driving event type may be determined based on received data. An event object that includes details of the determined event may be generated, including the type of the determined event and a time association with a segment of captured driving video. Metadata tags may be generated, which contain the type of the determined event and the location of the event object in the memory of the DVR. The DVR may retrieve segments of the driving video by identifying the metadata tag as having the same event type as a query parameter and, in turn, identify the event object using the location of the event object included in the metadata tag. The driving video segment may then be located via the association with the event object.

20 Claims, 13 Drawing Sheets

(51) Int. Cl.
    *H04N 21/414*     (2011.01)
    *G11B 27/10*     (2006.01)
    *H04N 21/432*     (2011.01)
    *H04N 21/472*     (2011.01)
    *G06F 16/783*     (2019.01)
    *H04N 21/433*     (2011.01)
    *H04N 21/422*     (2011.01)
    *G11B 27/32*     (2006.01)
    *G06F 16/74*     (2019.01)
    *G06F 16/78*     (2019.01)
    *G11B 27/28*     (2006.01)

(52) U.S. Cl.
    CPC ...... *G06F 16/7844* (2019.01); *G06F 16/7867* (2019.01); *G11B 27/105* (2013.01); *G11B 27/322* (2013.01); *H04N 21/41422* (2013.01); *H04N 21/42202* (2013.01); *H04N 21/432* (2013.01); *H04N 21/4334* (2013.01); *H04N 21/44008* (2013.01); *H04N 21/472* (2013.01); *G11B 27/28* (2013.01)

(56) References Cited

U.S. PATENT DOCUMENTS

| | | |
|---|---|---|
| 2013/0091432 A1 | 4/2013 | Shet et al. |
| 2014/0380353 A1* | 12/2014 | Barton ............... H04L 63/0823 725/31 |
| 2015/0081706 A1 | 3/2015 | Elmqvist Wulcan et al. |
| 2016/0371553 A1 | 12/2016 | Farnham, IV et al. |
| 2017/0068831 A1 | 3/2017 | Hanis et al. |
| 2017/0293563 A1 | 10/2017 | DeHon et al. |
| 2018/0060617 A1 | 3/2018 | Hanis et al. |

\* cited by examiner

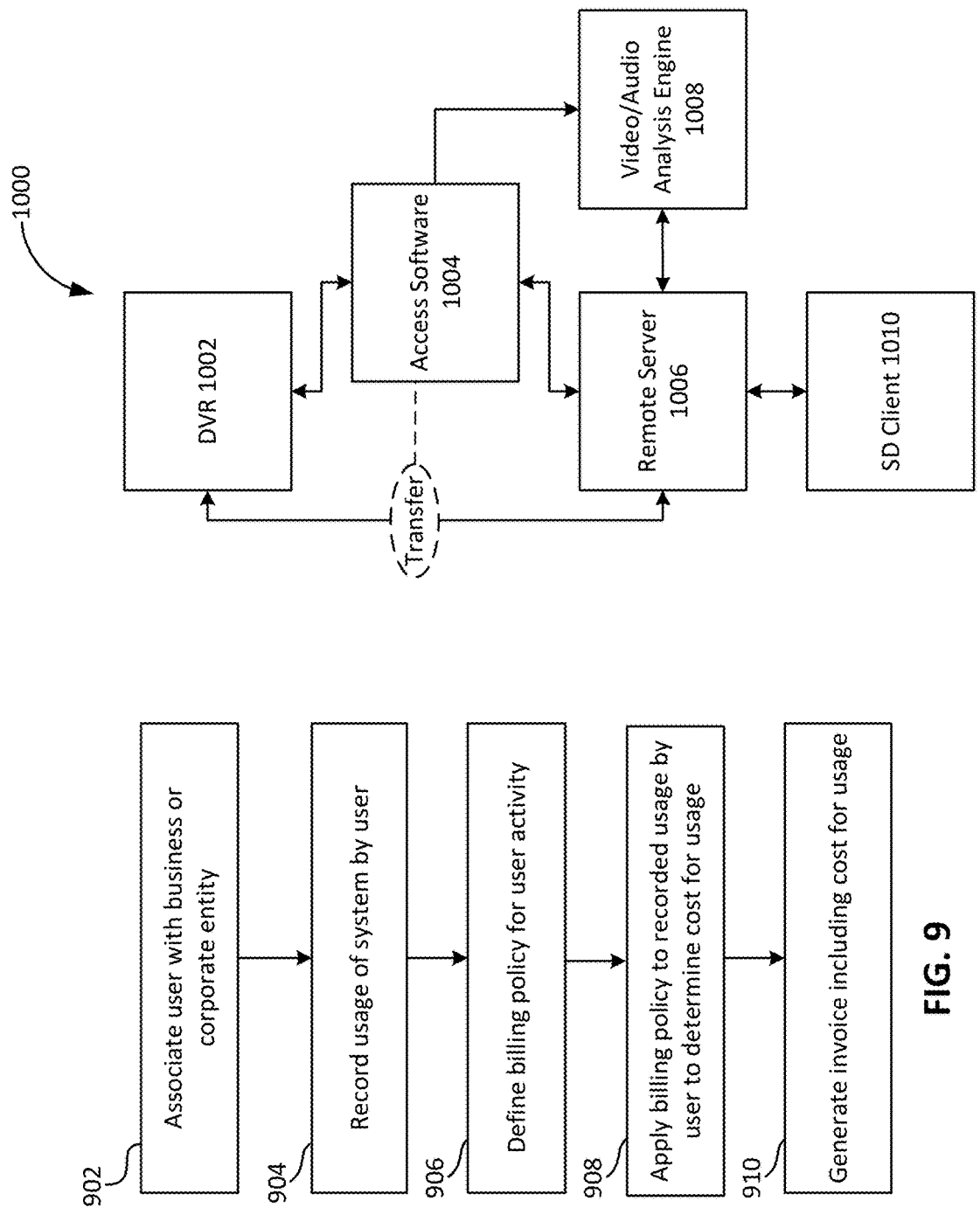

DRIVING ORIENTED DIGITAL VIDEO RECORDER SYSTEM

FIELD OF THE INVENTION

The embodiments herein relate generally to systems for collecting and viewing digital video. More specifically, particular embodiments relate to driving oriented digital video recorder systems used in vehicular fleet management.

BACKGROUND OF THE INVENTION

Existing digital video recorder ("DVR") systems are configured to record, search, and play video captured by a camera based on individual frames that are captured, and the frame rate at which the individual frames are captured. A linear timeline is derived from the framerate and is generally relative to the starting point or ending point of the video. The captured frames are used as points on the timeline. For instance, some existing DVR systems can play back video in real time (i.e., at the framerate at which it was captured), at half-speed (i.e., at half the framerate at which it was captured), or at some other multiple of the original framerate at which the video was captured (e.g., X times the original framerate).

Additionally, most existing DVR systems are capable of starting playback at a specified point (i.e., any of the captured frames) along the associated timeline, such as at 1 hour from the beginning of the timeline. Moreover, some existing DVR systems are capable of retrieving and playing back frames at a specific interval. For instance, a user may specify that every 25th or every 50th frame be played back in a series. Each of these above-described features, however, is dependent on the captured frames and the associated timeline.

For certain activities, however, it is desirable to be able to retrieve captured video based, at least partially, on criteria other than a timeline associated with the captured video. In certain environments, it is desirable to retrieve video segments based on the occurrence of events that happen while the video is being captured. Driving, for instance, happens in both time and space. Accordingly, it is advantageous to provide a manager of commercial drivers (e.g., drivers of commercial fleet vehicles) the ability to quickly identify and retrieve/view/store segments of video that correspond to identified events, or the value of a known variable, during a driving excursion.

As an example, a manager of a fleet of commercial vehicles may want to retrieve video based on the identified driver of a vehicle, and/or the location of the vehicle at a given time on the video timeline. Further, a fleet manager may want to retrieve video based on vehicle speed, vehicle braking, vehicle acceleration, weather conditions surrounding the vehicle, etc. A fleet manager may want to retrieve, view, or transfer captured video based on any other single, or combination of, detectable and recordable events, situations, or variables related to a recorded driving excursion. A driving oriented DVR system and corresponding methods should reflect these and other features.

SUMMARY OF THE INVENTION

In accordance with an embodiment, and as described herein, a digital video recorder (DVR) system may comprise a camera; a memory; and a control circuit. The control circuit may be configured to receive video captured by the camera; store the video in the memory; determine the occurrence of a predefined event type based on received data; generate an event object that includes details of the determined event, including the type of the determined event and a time association with a segment of the video; store the event object in the memory; generate a metadata tag that contains the type of the determined event and the location of the event object; receive a query including a parameter that specifies the determined event type; identify the metadata tag as having the same event type as the parameter query; identify the event object using the location of the event object included in the metadata tag; and return, as the result of the query, the location of the video segment associated with the event object.

In accordance with another embodiment, a method may comprise: querying, from an access software executing on an electronic device, a digital video recorder (DVR), wherein the query contains a predefined event type as a parameter; receiving, by the access software, one or more locations of video segments associated with the predefined event type; listing user selectable items representing each received video location via a display of the electronic device; receiving a selection of at least one of the user selectable items, and initiating a transfer of the video segment at the location represented by each of the selected selectable items from the DVR to a remote server.

Other embodiments, features and advantages of the example embodiments will become apparent from the following description of the embodiments, taken together with the accompanying drawings, which illustrate, by way of example and not limitation, the principles of the example embodiments.

BRIEF DESCRIPTION OF THE SEVERAL VIEWS OF THE DRAWINGS

FIG. 9 is a flow chart for generating an invoice based on usage of a driving oriented DVR system, in accordance with an embodiment.

FIG. 10 is a block diagram of a driving oriented DVR system, in accordance with an embodiment.

Figure 1:
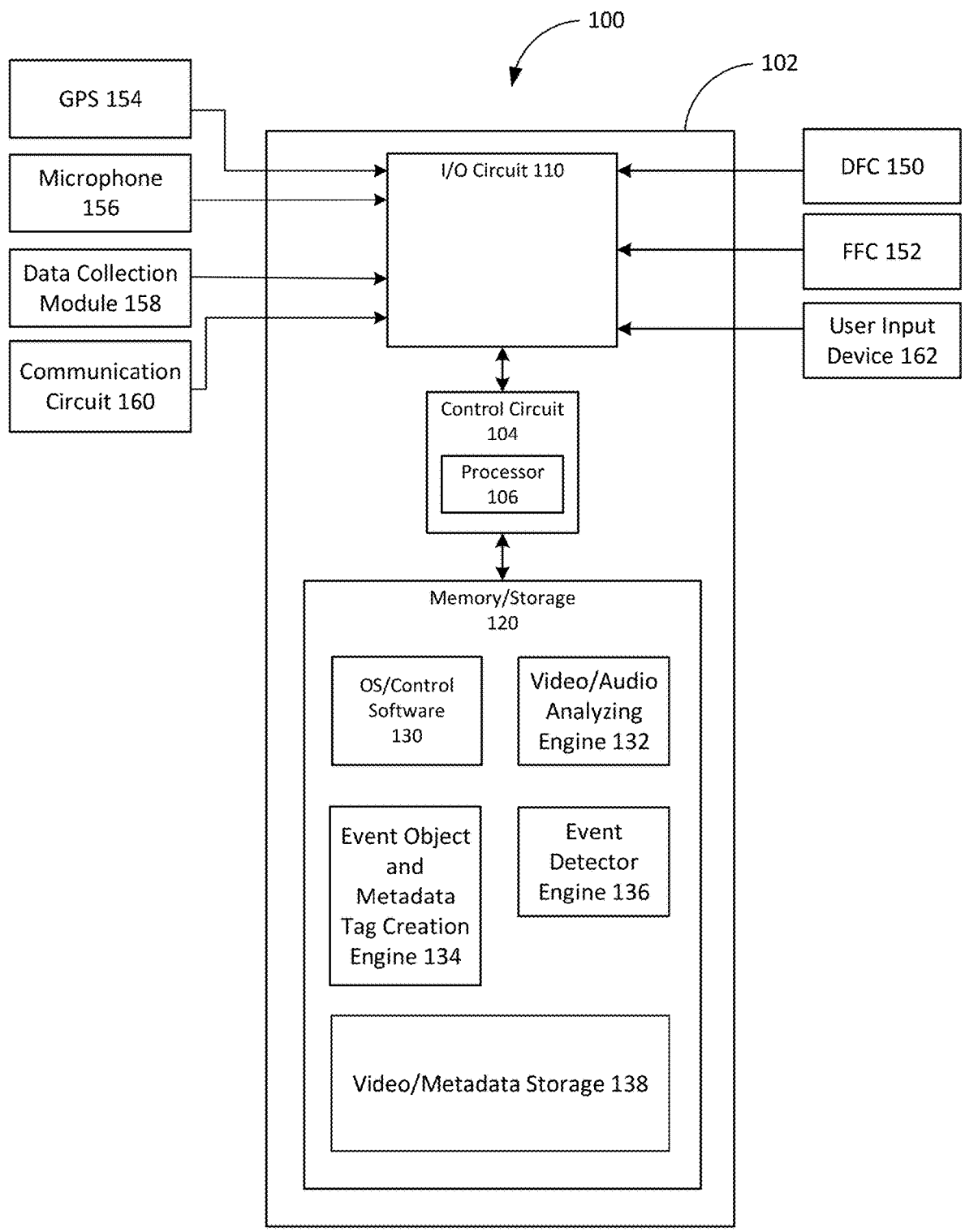
FIG. 1 is an exemplary block diagram of a driving oriented digital video recorder (DVR) system 100 in accordance with an embodiment.

The accompanying drawings, which are incorporated in and constitute a part of this specification, illustrate several embodiments of the invention and together with the description, serve to explain the principles of the invention.

DETAILED DESCRIPTION OF THE EXAMPLE EMBODIMENT

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

In accordance with an embodiment, a driving oriented DVR system is configured to store video captured by one or more cameras integrated with a vehicle as the vehicle progresses throughout a driving excursion. One or more video cameras, e.g., digital video cameras, can be mounted in various places either inside or outside the cabin of a vehicle in order to capture various scenes within the field of view of each camera as the vehicle progresses through the driving excursion.

Certain embodiments, may include one or more forward facing cameras that are configured such that the field of view of the camera(s) captures the scene ahead of the vehicle from, for example, the perspective of a driver of the vehicle. Other embodiments include one or more driver facing cameras configured to capture a view of the driver of the vehicle, and/or a view of other areas of the cabin, as the driver controls the vehicle throughout the driving excursion. Still other embodiments may include cameras configured to capture other scenes relative to the vehicle as the vehicle progresses throughout a driving excursion. For instance, embodiments may include cameras configured to capture the scene behind the vehicle, to either side of the vehicle, etc. Throughout this document, such video captured by one or more vehicle mounted cameras during, and of, a driving excursion, and recorded to a driving oriented DVR, is referred to as "driving video."

The driving oriented DVR system may be further configured to collect and generate metadata, which includes detailed information of a driving event, and that corresponds to a point in time during a driving excursion, and also to a point in time on the timeline of a driving video captured by the driving oriented DVR system during the driving excursion. Such metadata can include data collected from components of, or components interacting with, the driving oriented DVR system. These components can detect, in real time, driving and driving related events that happen over the course of a driving excursion. The components can report such events to the driving oriented DVR system. Examples of events that may be reported to/collected by the driving oriented DVR system in real time include vehicle speed, acceleration, location, control signals, settings, distance traveled since trip start, odometer value, etc. These examples only represent a small number of the events that may be captured in real time by vehicle components, and are not meant to be limiting.

Driving events can also be collected through an analysis of the captured driving video and/or audio. For example, the speed limit of a segment of road can be detected by analyzing the captured driving video to identify speed limit signs captured in the video. Upon identifying a speed limit sign, and the speed limit indicated thereon, a speed limit (change) event may be generated. Depending on embodiments, this analysis may be performed by the driving oriented DVR system as the driving video is captured. In alternative embodiments, this analysis may be offloaded to remote systems.

The driving oriented DVR system can generate event objects based on the metadata generated from driving events reported to the driving oriented DVR system (whether real time, or generated through driving video analysis). The driving oriented DVR system may then associate the event object with one or more driving videos. The event object may be associated with the driving video in such a way that it corresponds in time to a segment of the driving video. Once the event object is associated with the captured video, relevant portions of the video may be conveniently accessed based on requests specifying particular event occurrences. For example, a user of the system may request retrieval of all time segments of a particular driving trip where a certain driver operated the vehicle over a certain speed in a particular geographic location. Once identified and retrieved, the user may use the system to perform other useful operations on the identified time segments, such as viewing the retrieved segments, and/or moving the retrieved segments to a more permanent storage (i.e., storage other than that of the driving oriented DVR system).

In accordance with an embodiment, the driving oriented DVR system may use data collected directly from vehicle components (e.g., devices, sensors, or systems), and data collected from an analysis of driving video, to generate event objects that correspond in time with one or more driving videos. Event objects generated from an event collected directly from system components may be associated with any driving video whose timeline spans or overlaps the time when the event was detected/collected. Event objects generated from an event determined from processing of captured driving video may at least be associated with the video from which it was generated, but may also be associated with other driving videos whose timelines span or overlap the time when the event was detected/collected (in these scenarios, the time may be calculated based on the video frame or frames from which the event object was derived).

As used herein, the term "event object" means a predefined data structure that contains data, or metadata, collected or generated as the result of a determination that a predefined driving event has occurred. Event objects may be defined and created for each defined driving event. A defined, or predefined driving event is a driving related event the occurrence of which the driving oriented DVR system can determine. As noted above, driving events can be determined by an evaluation of real-time data received/collected from vehicle components, or from an evaluation of captured driving video or audio. Event objects may be generated based on any determined driving event. Driving events and event objects are discussed in more detail, below.

FIG. 1 is an exemplary block diagram of a driving oriented digital video recorder (DVR) system 100 in accordance with an embodiment. Driving oriented DVR system 100 includes driving oriented DVR 102 (also referred to herein simply as "DVR 102"), driver facing camera (DFC) 150, forward facing camera (FFC) 152, global positioning system (GPS) unit 154, microphone 156, data collection module 158, communication circuit 160, and user input device 162. It is to be understood that the components depicted may be arranged and combined in any suitable manner to carryout disclosed embodiments. For instance, the components described herein may be arranged to interact with an existing DVR, rather than be integrated into a DVR.

DVR 102 includes input/output (I/O) circuit 110 (e.g., a system bus), control circuit 104, and a memory/storage 120. Control circuit 104 is responsible for the overall operation of DVR 102. Control circuit 104 may be implemented as, or include, hardware (e.g., a microprocessor, microcontroller, central processing unit (CPU), etc.) or a combination of hardware and software (e.g., a system-on-chip (SoC), an application-specific integrated circuit (ASIC), etc.). In one embodiment, control circuit 104 includes a processor 106 that executes operating instructions. The processor 106 of control circuit 104 may execute code in order to carry out the operations of DVR 102. Such code may be stored in memory/storage 120.

Memory/storage 120 includes one or multiple memories and/or one or multiple other types of storage mediums. For example, memory/storage 120 may include a random access memory (RAM), a dynamic random access memory (DRAM), a cache, a read only memory (ROM), a programmable read only memory (PROM), flash memory, and/or some other type of memory. Memory/storage 120 may include a hard disk (e.g., a magnetic disk, an optical disk, a magneto-optic disk, a solid state disk, etc.). In a typical arrangement, memory/storage 120 includes a non-volatile memory for long term data storage and a volatile memory that functions as the system memory for control circuit 104. The memory/storage 120 may exchange data with control circuit 104 over a data bus. Accompanying control lines, and an address bus, between memory/storage 120 and control circuit 104 may also be present. Memory/storage 120 is considered a non-transitory computer readable medium.

Memory/storage 120 stores OS/control software 130, which may include device firmware, or an operating system (OS). By way of example, depending on the implementation of DVR 102, the operating system may correspond to Linux, Unix, Android, iOS, etc.

Memory/storage 120 can store additional instructions that carry out different functions of DVR 102. In accordance with an embodiment, these instructions may be in the form of applications configured to interact with OS/control software 130 and/or control circuit 104. For example, memory/storage 120 may store video analyzing engine 132, metadata tagging engine 134, and event detector engine 136. Additionally, a portion of memory/storage 120 may be used as video/metadata storage 138, which stores video captured by, e.g., forward facing camera (FFC) 150 and driver facing camera (DFC) 152. Video/metadata storage 138 may also store metadata as identified by metadata tagging engine 134.

Input/output circuit 110 interfaces control circuit 104, and memory 120, with other components that may be included in driving oriented DVR system 100. For example, forward facing camera (FFC) 150 and driver facing camera (DFC) 152 can interface with DVR 102 via I/O circuit 110. Via I/O circuit 110 and control circuit 104, FFC 152 and DFC 150 can access memory/storage 120 and can store captured video to video/metadata storage 138. Likewise metadata tagging engine 134 may receive signals from GPS unit 154 via I/O circuit 110 and control circuit 104. Further, event detector 136 may receive signals from data collection module 158 via I/O circuit 110 and control circuit 104.

In accordance with an embodiment, driving oriented DVR system 100 may include communication circuit 160. Communication circuit 160 may include one or multiple wireless interfaces and/or wired interfaces (not shown). Communication circuit 160 may further include one or multiple transmitters, receivers, and/or transceivers coupled to, e.g., an antenna (not shown), for communication with other electronic devices. Communication circuit 160 operates according to one or multiple protocols, communication standards, and/or the like (i.e., Ethernet, TCP/IP, Wi-Fi, USB, Bluetooth, cellular, Near-field Communication (NFC) etc.). Communication circuit 160 may be used to transmit captured video, or other data, to or from driving oriented DVR system 100.

User input device 162 may be any user interface device or control system by which a user interacts with DVR 102. For instance, user input device may be one or all of a control pad with control buttons, a keyboard, a mouse, a touchscreen, etc. In some embodiments, DVR 102 does not include a user input device, and access to, and control of, DVR 102 is gained remotely from a connected device (e.g., connected via communication circuit 160).

DFC 150 and FFC 152 (and any other cameras included in the driving oriented DVR system) may be any suitable cameras that can be mounted/adapted to capture the desired view and that can capture digital video of the desired view and interface with DVR 102 to store the captured video recordings into a memory/storage of DVR 102. The cameras may be of type Omnivision 10635. Because digital cameras are well known, this document will not discuss digital cameras in detail.

As discussed above, in addition to storing video, a driving oriented DVR system may determine the occurrence of driving events based on data generated by different components of, or associated with, the system. For example, GPS unit 154 can send data to DVR 102 that indicate the position of a vehicle throughout the duration of a driving trip involving the vehicle. Likewise, microphone 156 can send data to DVR 102 that indicate different audio events (e.g., radio on/off, driver speaking, etc.). Moreover, a data collection module, such as data collection module 158, can send data to driving oriented DVR 102 indicating an array of different driving events which the data collection module is configured to detect.

GPS unit 154 may be any suitable GPS unit, and may be integrated with DVR 102 or may be a separate component from DVR 102. In accordance with various embodiments, GPS unit 154 may access I/O circuit 110 via communication circuit 160, or may access I/O circuit 110 directly.

Likewise, microphone 156 may be any suitable microphone, and may be integrated with DVR 102 or may be a separate component from DVR 102. In accordance with various embodiments, microphone 156 may access I/O circuit 110 via communication circuit 160, or may access I/O circuit 110 directly. One embodiment of the microphone has a sensitivity pattern favoring the driver, toward whom it is pointed, and with less sensitivity toward the passenger. This sensitivity pattern aids in distinguishing who is speaking, should a passenger be present. A calibration step of this directional sensitivity may involve sending an equal volume audio signal to the stereo speakers in the vehicle, with knowledge of which side is which, and associating a drop in volume with the passenger direction. A further embodiment may localize sound sources in the cab by using two directional microphones, and performing cross correlation between signals, relating relative volume of highly cross correlated signals to their location in the vehicle cabin.

Figure 2:
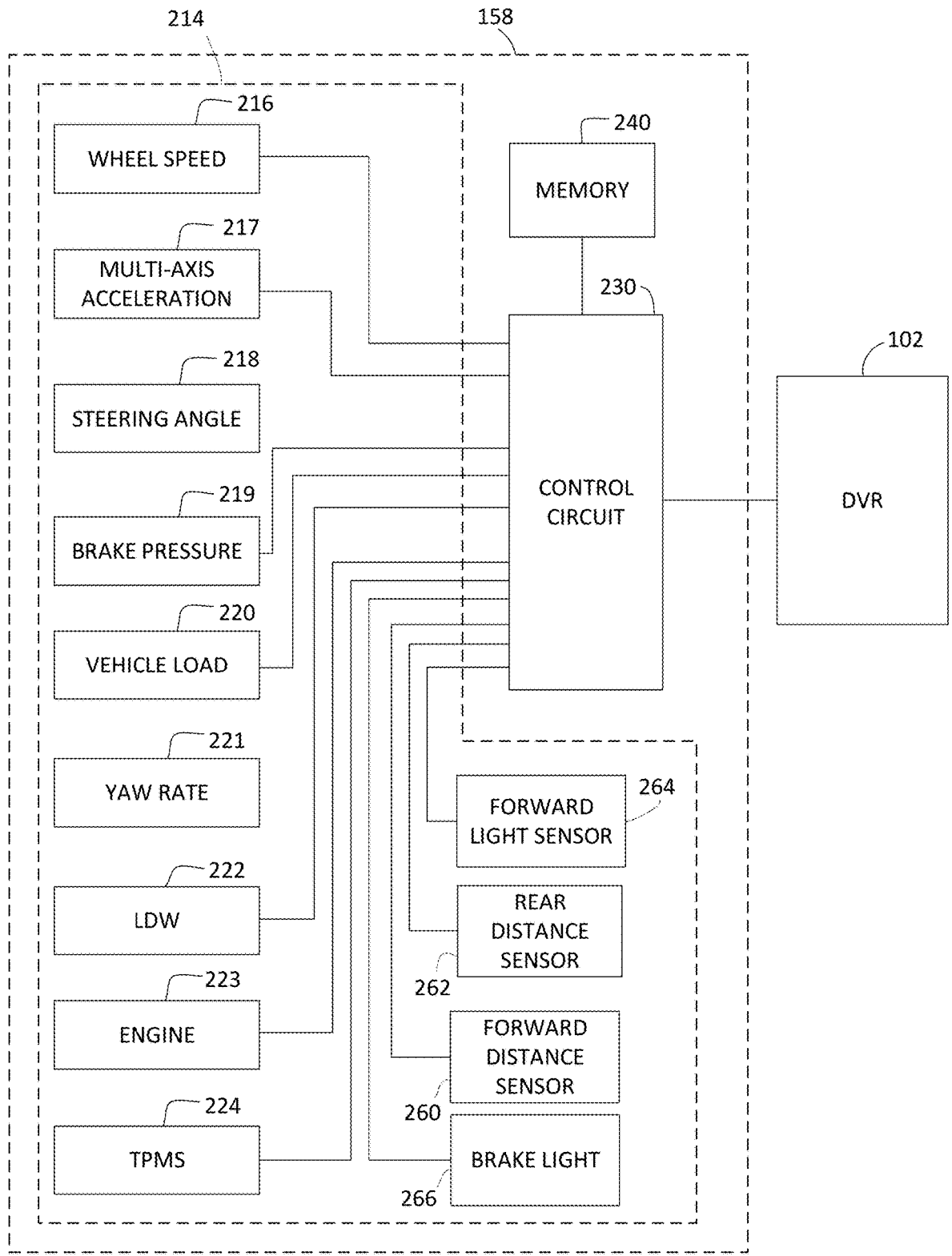
FIG. 2 is a detailed schematic representation of a data collection module, in accordance with an embodiment.

With additional reference to FIG. 2, a detailed schematic representation of a data collection module 158 is illustrated, in accordance with an embodiment. The data collection module 158 may be adapted to monitor a variety of operational parameters and conditions of a vehicle (e.g., a commercial vehicle such as a tractor-trailer type truck) and the driver's interaction therewith, and to communicate with (e.g., report to) a driving oriented DVR (e.g., DVR 102) regarding the monitored parameters and conditions.

As shown in the exemplary embodiment of FIG. 2, the data collection module 158 may include one or more devices, systems, or sensors 214 for providing data indicative of one or more operating parameters or one or more conditions of a vehicle. For example, devices, systems, or sensors 214 may include one or more sensors, such as but not limited to, one or more wheel speed sensors 216, a multi-axis acceleration sensor 217, a steering angle sensor 218, a brake pressure sensor 219, a vehicle load sensor 220, a yaw rate sensor 221, a lane departure warning (LDW) sensor or system 222, one or more engine condition sensors 223, and a tire pressure monitoring system (TPMS) 224. The data collection module 158 may also utilize additional devices or sensors not described in the exemplary embodiment, or combine one or more devices or sensors into a single unit.

The data collection module 158 may also include a logic applying arrangement 230, such as a control circuit or processor, in communication with the one or more devices, sensors, or systems 214. The control circuit 230 may include one or more inputs for receiving data from the devices, sensors, or systems 214. The controller 230 may also include a memory portion 240 for storing and accessing system information, such as, for example, system control logic for data collection module 158. The memory portion 240, however, may be separate from the controller 230. The devices, sensors, or systems 214 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The data collection module 158 may be integrated with the Bendix ESP system, which may utilize some or all of the devices, sensors, or systems described in FIG. 2.

Likewise, and in accordance with an embodiment, the memory 240 and control circuit 230 of the data collection module 158 may be shared with other vehicle systems. For instance, the logic component of the Bendix ESP system (describe above) resides on the vehicle's antilock brake system electronic control unit ("ECU"). Accordingly, the antilock brake system ECU may be used for the control circuit 230 of the data collection module. In other embodiments, the engine ECU of the vehicle may be used as the control circuit of the data collection module. In still other embodiments, the data collection module and the driving oriented DVR may share a control circuit and/or memory/storage. In still further embodiments, the memory 240 and control circuit 230 of the data collection module 158 may be dedicated to the data collection module. In a further embodiment, the system may be run on an IM.X.6 processor.

In accordance with an embodiment, raw data from the devices, sensors, or systems 214 may be received by the control circuit 230. The control circuit 230 may further include one or more outputs for delivering signals to other vehicle systems. For instance, the controller may be configured to deliver a data signal to a driving oriented DVR, such as DVR 102, as shown in FIG. 2 (e.g., via I/O circuit 110 of DVR 102, as depicted in FIG. 1). In accordance with an embodiment, data collection module 158 may be configured to communicate with a DVR (e.g., DVR 102) over a wired or wireless connection (for example, via communication circuit 160).

The raw data generated by devices, sensors, or systems 214 may be analyzed by the driving oriented DVR system to determine whether a predefined driving event has occurred. For example, the driving oriented DVR system may be configured to process the input data provided by devices, systems, or sensors 214 and compare the input data to a stored threshold value. Events may be determined to have occurred when the input data is determined to be a predefined value relative to the threshold value. Additionally, some events may be determined to have occurred when the input data is determined to be a predefined value relative to the threshold value for a specified period of time. Other events may be determined to have occurred when the input data from multiple devices, sensors, or systems of the data collection module are determined to be a predefined value relative to respective threshold values.

Figure 3:
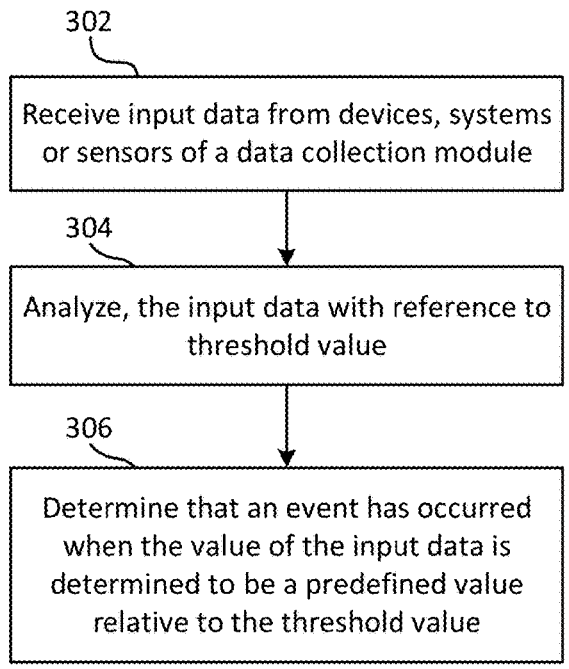
FIG. 3 shows a flow chart for determining whether a driving event has occurred, in accordance with an embodiment.

FIG. 3 shows a flow chart for determining whether an event has occurred, in accordance with an embodiment. At step 302, input data is received from devices, systems or sensors of a data collection module. At step 304, the input data is analyzed with reference to a threshold value. At step 306, it is determined that an event has occurred when the value of the input data is determined to be a predefined value relative to the threshold value.

Examples of predefined driving events that may be determined from data received from data collection module 158 include persistent, over a threshold, acceleration—either longitudinally or laterally (e.g., based on data received from multi-access acceleration sensor 217); a high steering rate over a period of time when driving over a certain speed (e.g., based on data received from wheel speed sensor 216 and/or steering angle sensor 218); persistent insufficient headway time to a vehicle ahead (e.g., based on data received from forward distance sensor 260); large amplitude, un-signaled, lane departure (e.g., based on data received from lane departure warning system 222), etc. Further events are available in the current Bendix Safety Direct system, which captures 20 seconds of imagery around such events, both prior to and following the event (i.e., in a black box fashion).

Additional examples of driving events that may be detected or reported by, or collected from, a data collection module or other devices or sensors include, but are not limited to:
  the presence of the vehicle in a predefined area, where the area is defined on a map including the route of the driving excursion, and where a GPS signal is used to determine when the vehicle enters and/or leaves the predefined location—city, state, zip code, terrain, etc., may be associated with the predefined areas;
  speed, or speed range;
  gear or gear range;
  brake pressure, braking type, or brake usage;
  engine rpm (e.g., either throttled or dethrottled);
  fuel flow (e.g., unusually high or low, for a given road section, for a given time of day, for a given driver, for a given vehicle);
  traffic proximity (e.g., a following-too-close event);
  by road type (e.g., highway, primary, rough, smooth).

In accordance with an embodiment, driving events may be determined to have occurred (as described above) by the control circuit of the data collection module as they are received from the devices, sensors, or systems. The determined driving events may then be communicated to a driving oriented DVR. In an alternative embodiment, the raw data from the devices, sensors, or systems 214 are communicated to the driving oriented DVR, and the raw data is analyzed by the driving oriented DVR (e.g., by event detector engine 136) in order to determine events that have occurred.

For example, and with continued reference to FIGS. 1 and 2, input data from the devices, sensors, or systems 214 of the data collection module 158 may be sent to, and received by, driving oriented DVR 102. Event detector engine 136 may analyze the input data to determine whether a predefined driving event has occurred. Event detector engine 136 may include or have access to driving event rules, including logic and/or values (e.g., the threshold values and the comparison logic described above) that define each driving event that can be determined by driving oriented DVR system 100. If, based on the received input data from data collection module 158 and the driving event rules, event detector engine 136 determines (e.g., as described above) that a driving event has occurred, event detector engine 136 may generate and collect data reflecting the type of driving event, and details about the driving event, that has occurred. This generated and collected data may be used to create an event object (e.g., by event object and metadata tag creation engine 134) that corresponds to the determined driving event.

Figure 12:
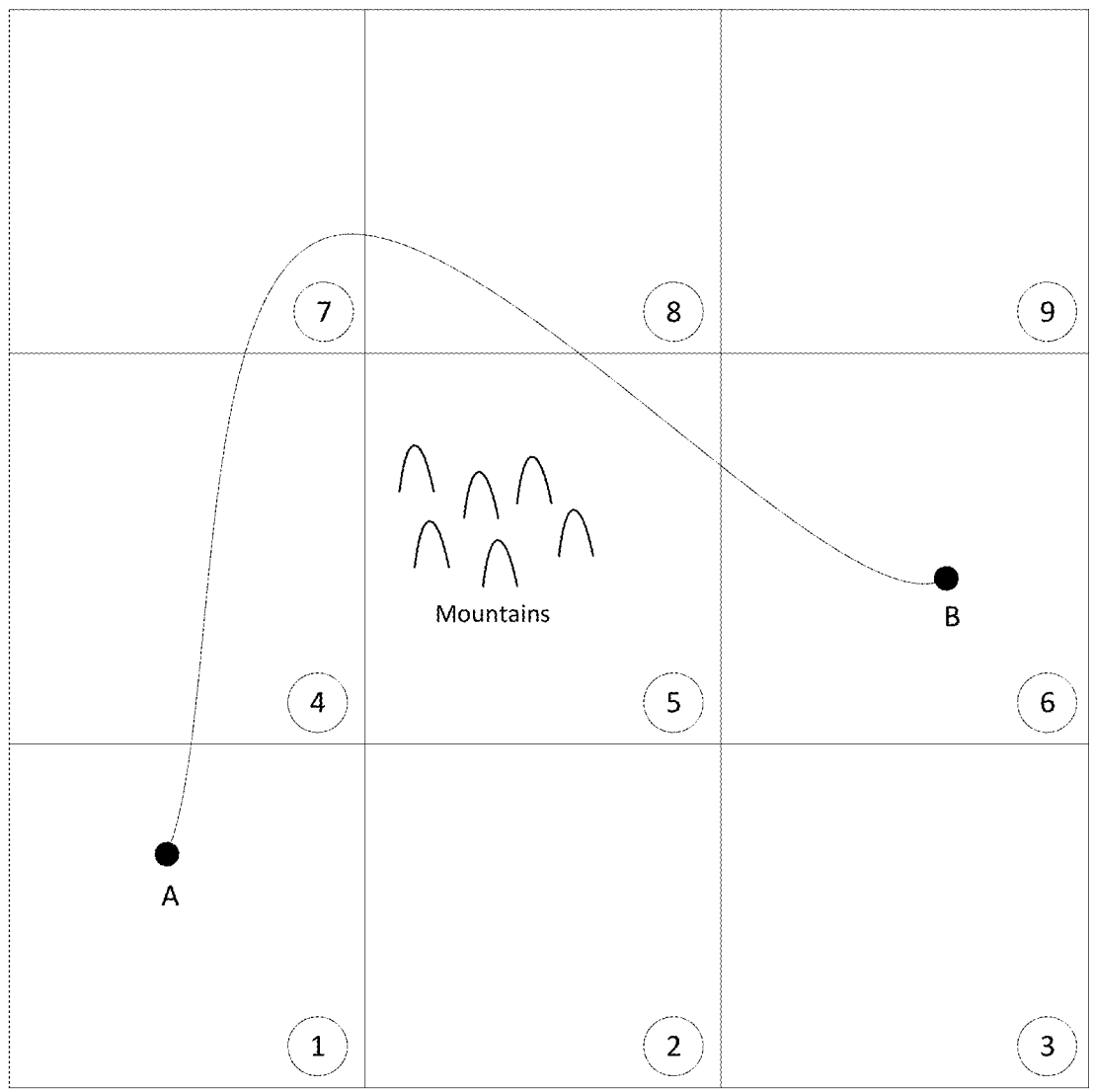
FIG. 12, shows an example of map discretization, in accordance with an embodiment.

As noted above, a driving event may be determined to have occurred when a vehicle enters/leaves a predefined area. With reference to FIG. 12, shown is an example of map discretization, where continuous space on a map is divided into two-dimensional bins or grid squares, in accordance with an embodiment. The grid square sizes may be sized such that a vehicle traveling at highway speeds changes grid square e.g., every 2 or 5 or 10 minutes. This may roughly correspond to a grid size of 2 by 2, or 5 by 5, or 10 by 10, miles respectively. These values may be chosen as a compromise between having many determined location driving events (as a result of relatively small map grid squares)—and, therefore, many corresponding event objects and metadata tags—and having fewer location tags with ensuing reduced localization. A sub-grid may be provided that is a secondary grid, for example, a 2 by 2 or 3 by 5, grid. The sub-grid may be applied in areas of typically slower traffic speeds. Such sub-grid divisions permit approximately similar-in-time length video snippets to be retrieved for the lower speeds in these areas. More general grid shapes are possible, such as triangles, polygons, etc., as well as a mix thereof. The division of the map into discrete grid squares/shapes is understood by both the software accessing the recorded data and the DVR as it bins (the continuously valued) locations into the (discrete) grid.

With continued reference to FIG. 12, as the vehicle travels from point A to point B in the example, a number of grid squares are traversed. These are, in order, 1, 4, 7, 8, 5, and 6. A driving event may be determined to have occurred when the vehicle transitions from one of the predefined areas to another. Thus, a corresponding event object may indicate when the predefined area was entered (e.g., using the previous determined "area-change" driving event) and when the predefined area was exited (using the most recent area-change event). This will allow other data to be determined (and associated with the event object) such as total time in the area. Further, GPS locations determined while in the area may be associated with the event object, and the route while inside the area may be determined (and associated with the event object). A location query might then be, e.g., for events on the road northeast of the mountains, or grid square 5. Instead of needing to examine the whole trip from A to B, one may then limit the search to grid square 5, and so save time.

Driving events may also be determined by analyzing captured driving video, or captured audio that corresponds to the captured driving video, in accordance with an embodiment. The captured video frames may be processed using, for example, optical character recognition (OCR) methods, facial recognition methods, feature detection methods, or other image processing methods. The image processing methods may produce data representing information contained in the processed image frame. For example, the text of a speed limit sign captured in an image frame may be identified as the two characters "55". Further optical processing of the image may identify the sign containing the text as a speed limit sign. Using this data, a driving oriented DVR system may identify the start of a 55 mile-per-hour (MPH) zone. The start of a maximum speed zone may be a predefined driving event, and as such, the driving oriented DVR system (e.g., audio/video analyzing engine 132) may determine that a (speed zone) driving event has occurred. Based on other predefined driving events, such an analysis determining the speed zone driving event, above, may also trigger, for example, an over-speed event to be determined, if, for example, the driver persists at a speed that is higher than the indicated maximum speed.

The data generated from the image frame processing (used to determine the occurrence of a driving event), and other data generated in response to the determination of the driving event (e.g., details of the determined driving event) may be used to create an event object. For instance, the data generated by the image processing may be sent to event object and metadata tag creation engine 134, where the data may be arranged according to a predefined structure.

Other examples of driving events that may be determined through post-capture in-vehicle image processing include: recognizing, through facial recognition software, the driver of the vehicle (a driver-change driving event), whether the driver is talking (a driver-talking driving event), whether the driver's eyes are open or closed (a driver-sleeping driving event, for example), if the driver's eyes are on the road (a possible driver-distracted driving event), if the driver's eyes are on a rearview mirror (a mirror-check driving event), etc. Circumstances such as weather (i.e., raining, snowing), the presence of other vehicles in the field of view of the camera, the presence of moving animals in the field of view of the camera, etc., are examples of additional data that may be produced, and used to determine driving events, through post-capture processing of images.

Moreover, and in accordance with an embodiment, events may also be determined to have occurred based on an analysis of captured audio. For example, microphone 156 can capture, and DVR 102 can store, audio that corresponds to driving video (also captured and stored by DVR 102). The captured audio may be analyzed by, e.g., video/audio analyzing engine 132, to determine whether an (audio based) driving event has occurred. For instance, compressed audio may be recorded and analyzed to determine whether the audio volume exceeded a threshold, or deviated from expected spectral characteristics given the vehicle speed. Examples of audio based driving events include a radio on/off event, a driver speaking event, etc.

In accordance with various embodiments, all or part of any post-capture processing of captured image frames or audio may be done by the driving oriented DVR (e.g., by video/audio analyzing engine 132), or all or part of any post-capture image frame or audio processing of captured image frames may be offloaded to another component of the driving oriented DVR system. In certain embodiments, initial, computationally inexpensive, image frame and/or audio processing may be carried out by the driving oriented DVR, while computationally intensive image frame and/or audio processing can be performed subsequently by a different component of the system. As is discussed in more detail below, all or a part of the post-capture image frame and/or audio processing may be done by a server, or by access software, in communication with the driving oriented DVR.

As discussed above, the driving oriented DVR system (e.g., event detector engine 136, and or video/audio analyzing engine 132) may include or have access to rules, including logic and/or values (e.g., the threshold values and the comparison logic described above), that define each driving event that can be determined by driving oriented DVR system 100. For instance, a simple example may be made of the case where event detector engine 136 receives data from brake pressure sensor 219.

Event detector engine 136 may receive data from brake pressure sensor 219 that indicates a pressure value (where the pressure value represents an amount of pressure applied by a driver of the vehicle to the brake pedal of the vehicle). The data from brake pressure sensor 219 may indicate that the data is from brake pressure sensor 219 and/or is information pertaining to an applied brake pressure. Event detector engine 136 may recognize the received data as pertaining to an applied brake pressure and use the data as one or more parameters or inputs into a brake-pressure driving event rule. The brake-pressure driving event rule may evaluate the applied brake pressure data with regard to logic and values associated with the applied brake pressure rule when the rule was defined. The applied brake pressure rule may return data that indicates whether a brake pressure driving event has occurred. An example of a brake pressure driving event may be when a rapid change of brake pressure has occurred, from a low to persistent high value (i.e., panic stamping on the brake).

The applied brake pressure rule may be a software method or function, or may take the form of, e.g., an application specific integrated circuit (ASIC) or some other combination of software and/or hardware for processing the rule. At least part of the data received from brake pressure sensor 219 may be used as input into (i.e., a parameter of) the applied brake pressure rule method or function. The applied brake pressure rule may evaluate the received data that indicates a pressure value against a threshold value. If the data that indicates a pressure value is evaluated as greater than the threshold value (or equal to or greater than, or less than, depending on the embodiment) than a determination that a brake pressure driving event has occurred may be made. Other driving event rules may contain different and/or more complex logic, and/or more threshold values.

Some data received from, for example, data collection module 158 may represent continuous conditions. For example, wheel speed sensor 216 may report a wheel speed at any time while the driving oriented DVR system is operational. In accordance with an embodiment, devices, sensors, or systems (e.g., devices, sensors, or systems 214) that collect and send data (to the driving oriented DVR) representing continuous conditions may do so at predefined time intervals. For example, wheel speed sensor 216 may report the vehicles wheel speed every X milliseconds.

Other data received from, for example, data collection module 158 may represent continuous conditions over periods of time. For example, multi-axis acceleration sensor 217 may report acceleration over a period of time while the vehicle is accelerating. In accordance with an embodiment, devices, sensors, or systems (e.g., devices, sensors, or systems 214) that collect and send data (to the driving oriented DVR) representing conditions that are continuous over a finite period of time may do so at predefined time intervals while the condition exists. For example, multi-axis acceleration sensor 217 may report acceleration along a particular axis every X milliseconds while the vehicle is accelerating or decelerating.

Figure 13:
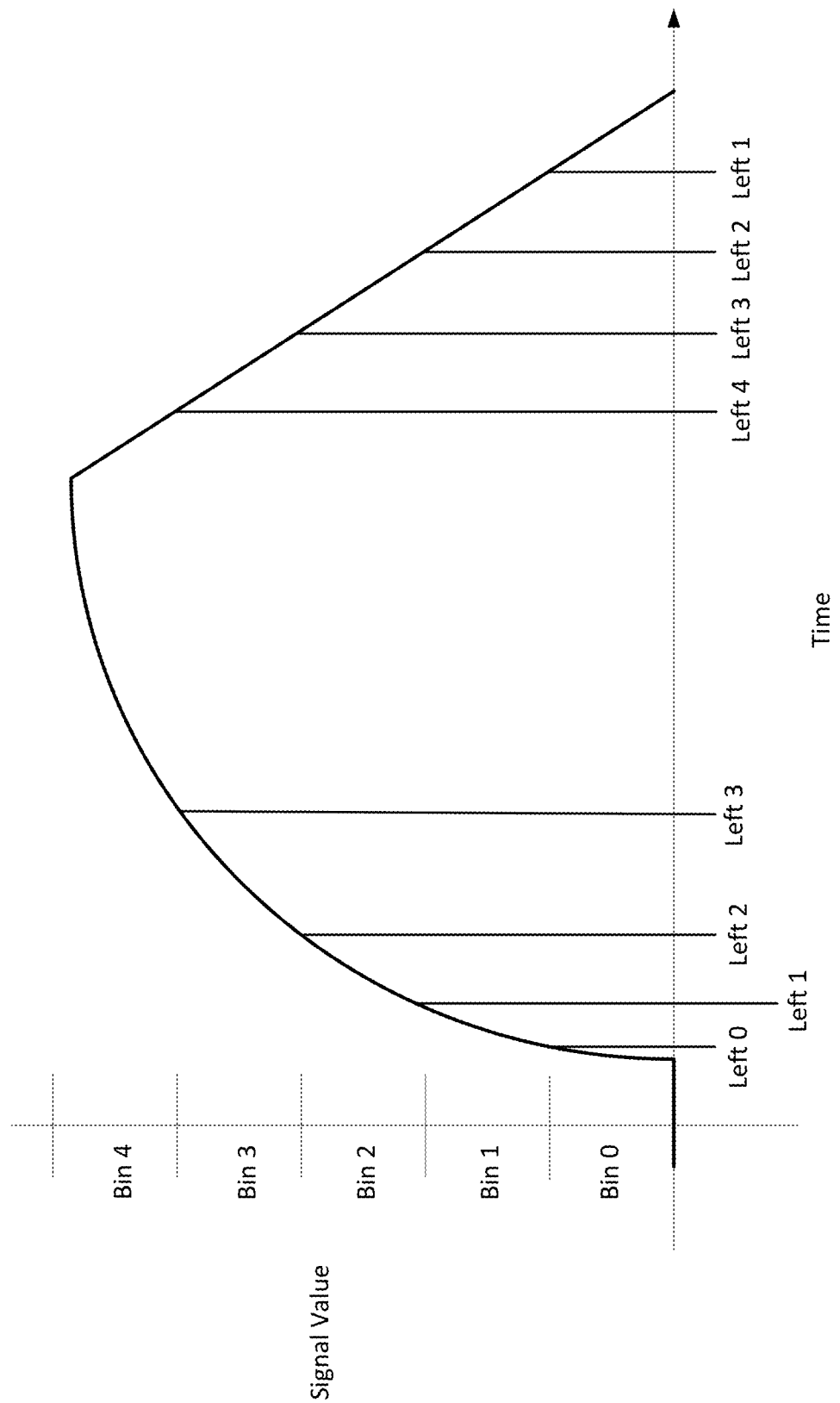
FIG. 13 shows an example of signal discretization, in accordance with an embodiment.

FIG. 13 shows an example of signal discretization via binning, in accordance with an embodiment. Time is shown on the abscissa, and signal value is on the ordinate. Bins are established for the ordinate values, for example, a speed bin 0 starting at speed 0 and going to 10 mph may be associated with a "speed" driving event, a speed bin 1 from 10 mph to 20 mph may be associated with another speed driving event, and so on. As a wheel speed signal increases in value (e.g., as received from wheel speed sensor 216), bin 0 is left, bin 1 is entered, and a corresponding event object is generated to reflect this. The event object may include data indicating when the signal bins are entered and departed. In a series of speed event objects, for example, recorded data may show that the speed rapidly increases initially and then levels off, followed by a steady decrease. Acceleration related event objects will be interspersed with the speed tags as the acceleration changes from strong to medium, and then to a negative value. The event objects and their corresponding metadata tags are used to rapidly locate those time instants when the signal is between values of interest.

In accordance with an embodiment, more finely divided events may be determined than what is shown in FIG. 13. For instance, an embodiment might separately determine acceleration and deceleration (so dividing acceleration into positive and negative values). Another embodiment may have three acceleration related events (strong deceleration, acceleration values around zero, and strong acceleration). These two driving event schemes may allow more rapid location of deceleration and acceleration tags, or more rapid location of strong braking (high deceleration), normal operation (acceleration values around zero), and rapid positive speed changes (high acceleration) tags, in response to a query of the tags. The more finely divided tags permit more direct isolation of episodes of interest but at the cost of needing to examine more tags.

Figure 14:
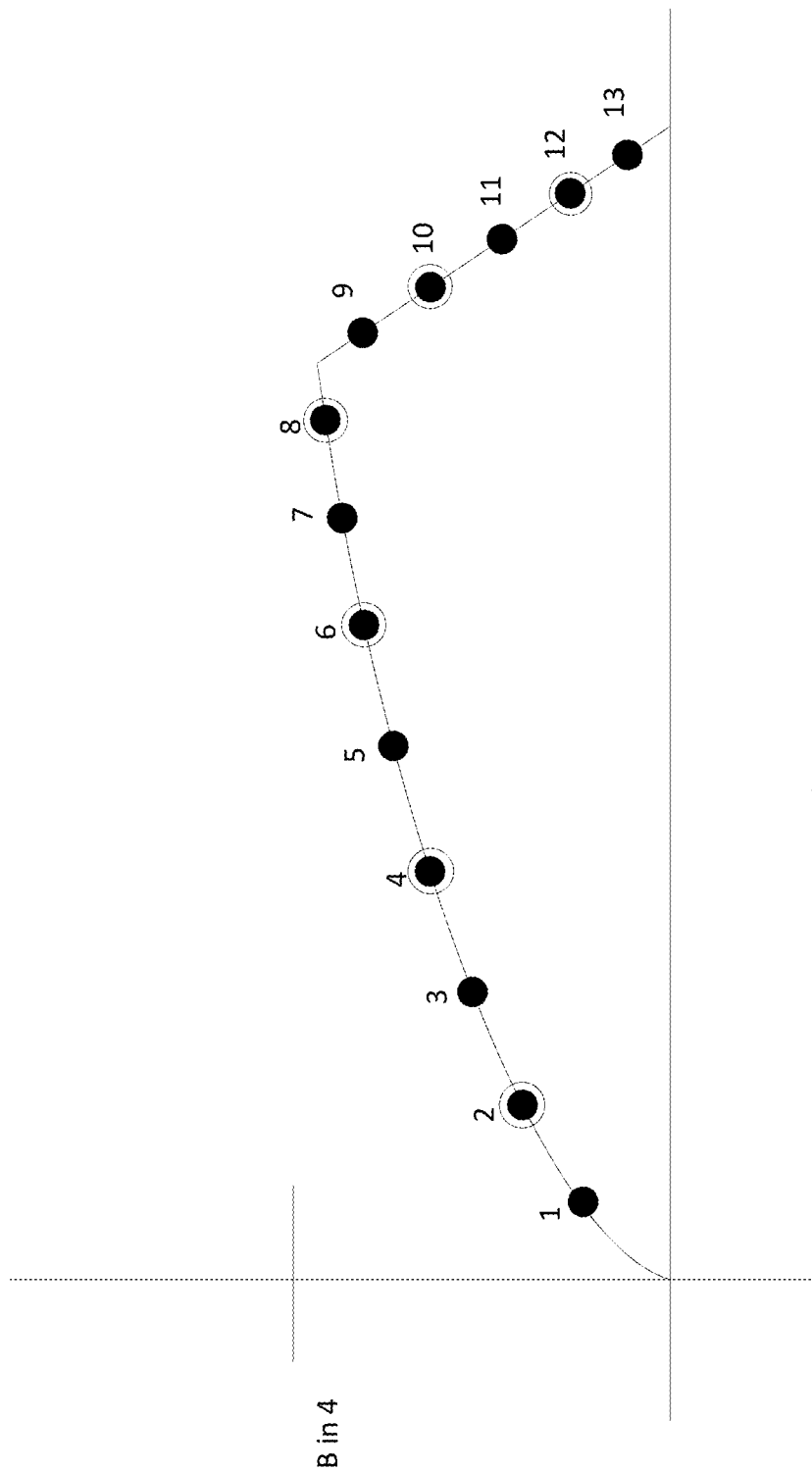
FIG. 14 shows an example of dynamically adjusted point count curve fitting used for describing signal behavior while in a driving event bin, in accordance with an embodiment.

With further reference to FIG. 14, shown is an example of a dynamically adjusted point count curve fitting used for describing signal behavior while in a driving event bin, in accordance with an embodiment. For instance, point 1 is within speed bin 4 for a while and would like to have a quick summary of how the speed changed while therein. Such a summary might be obtained by fitting a curve (a line, for example) to the speed data collected while in the bin. Curve fitting can become a computationally expensive operation however if many points are used in the fit. In the example of FIG. 14, the number of points used for the fit is limited to between 4 and 8. These points are collected and stored as the bin is entered, accumulating more and more thereof. When point 9 is reached, the limit of 8 has been exceeded, and a subsampling to every other point is made (shown as the circled values in FIG. 14). When the bin is finally exited, one has 6 data points that can be provided to a curve fitting scheme, thereby saving computation. Had more than 16 points been collected while within the bin, a subsample may be performed, e.g., discarding every other point and thereby retaining a number of points to fit that lie between 4 and 8. For example, a cubic data fit may then be made and the parameters thereof be stored in the corresponding event object. Accordingly, an approximation of how the speed (or any signal) value varied while within the bin can be made.

Other statistics, which may be recursively collected, such as the mean, the variance, detrended variance, etc., may also describe the signal behavior while within the bin. This type of information (e.g., speed variance) may be used as searching parameters when querying the driving oriented DVR (e.g., find all video where the speed variance was above a threshold, indicating, for example, that an unnecessary amount of fuel was likely used).

In accordance with an embodiment, driving oriented DVRs, as described herein, may be configured to store large amounts of video and metadata. For instance, in some embodiments, driving oriented DVRs may be configured to hold a week's worth of captured driving video and metadata. Some embodiments may be configured to store a month's worth of driving video and metadata, or more. Challenges are presented regarding methods of locating data of interest in such large data sets. As noted above, a desirable feature of a driving oriented DVR system is the ability to identify and retrieve, view, and/or transfer segments of video that correspond to determined driving events. In order to make the driving oriented DVR system satisfactorily user-friendly, however, this feature should also be accomplished in an efficient manner in order to return results sufficiently quickly to the user. This can present a challenge, because of the large amounts of data that a driving oriented DVR is adapted to store.

As discussed above, and in accordance with an embodiment, event objects may be created by the driving oriented DVR system (e.g., by event object and metadata tag creation engine 134) in response to a determined driving event. These event objects include details of the determined driving event that are either found in data received from vehicle components (the data used to determine a driving event) or generated in response to a determined driving event.

In accordance with an embodiment, in response to a determined driving event, event object and metadata tag creation engine 134 may generate, in addition to an event object, a metadata tag (also referred to herein simply as a "tag") that corresponds to the determined driving event and the event object generated as a result of the determined driving event. These metadata tags may be relatively lightweight as compared to the generated event objects. That is, the metadata tags may be more compact, requiring less storage space, and less processing to find/retrieve/manipulate. For instance, in accordance with an embodiment, a metadata tag can act as a pointer to a location (e.g., a memory address) where its corresponding event object is stored. In particular embodiments, a metadata tag may include only a type identifier (i.e., what type of event does this tag indicate) and a pointer to a location where its corresponding event object is stored. In other embodiments, a metadata tag may include more or less data.

The metadata tags may be indexed in a particular, isolated, area of the memory of a driving oriented DVR, in accordance with an embodiment. Such indexing of the relatively small metadata tags in, e.g., an isolated area of memory can provide efficient and rapid retrieval of queried tags. The isolated memory area may be reserved for metadata tags, and may store only metadata tags. The tags may be used in a process to quickly populate a list of relevant video segments, where the process does not involve direct access, and searching, of the more data-intensive video data or event objects.

Figure 4:
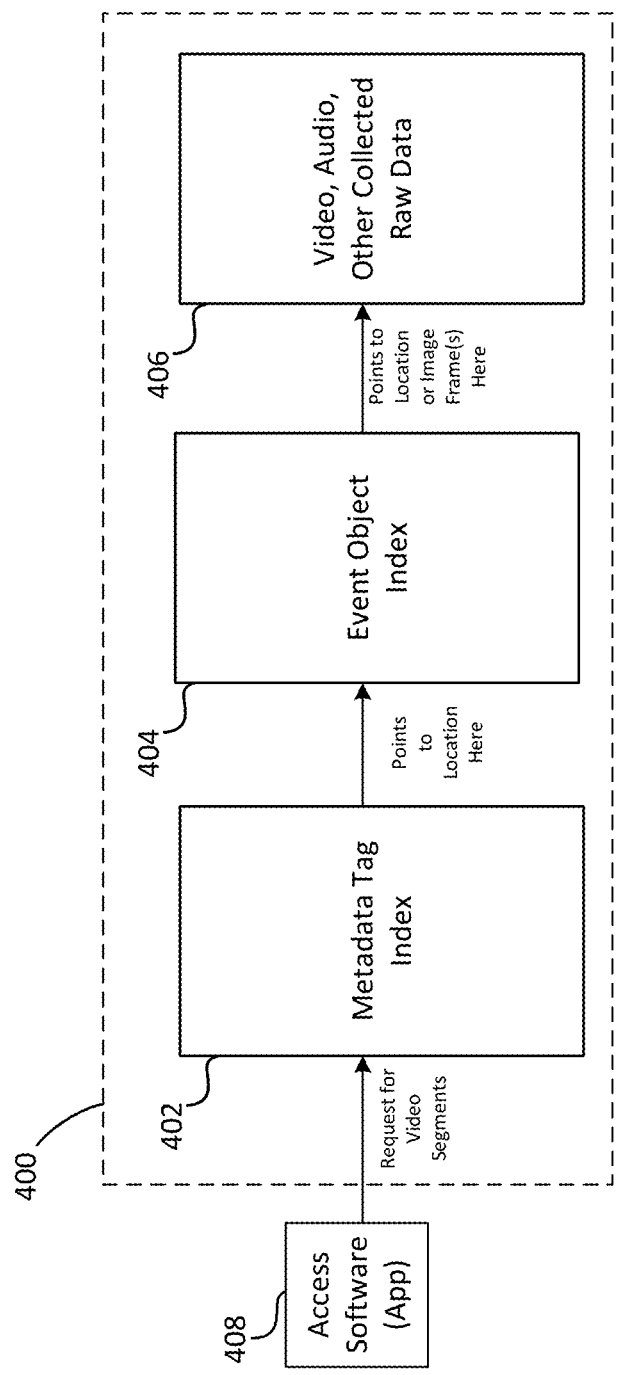
FIG. 4 is a schematic block diagram illustrating a memory/storage of a driving oriented DVR, in accordance with an embodiment.

FIG. 4 is a schematic block diagram illustrating a memory/storage of a driving oriented DVR (e.g., memory/storage 138, as depicted in FIG. 1), in accordance with an embodiment. The memory/storage 400 is partitioned into 3 segments: traditional storage partition 406, event object index partition 404, and tag index partition 402. Access software 408 is also illustrated.

Traditional storage partition 406 may typically be the largest partition of memory/storage 400. Traditional storage partition 406 may be used to store the driving video captured by a driving oriented DVR system. Audio data that corresponds to captured driving video may also be stored within the traditional storage partition 406. Further, other raw data captured by the driving oriented DVR system may be stored within the traditional storage partition 406. In accordance with an embodiment, traditional storage partition 406 may be configured as bulk storage, and may include enough data storage capacity to store a predetermined amount of video, audio and other raw data collected in bulk by the driving oriented DVR system (e.g., a week's or a month's worth of collected raw data). The data stored on traditional storage partition 406 may be compressed using, for example, H.264 compression, or motion JPEG for compression of the captured driving video.

Event object index partition 404 stores the event objects generated by the driving oriented DVR system in a structured format. Each detail of a determined driving event, whether collected or generated, is stored in event object index partition 404. The event objects may be stored in accordance with a predefined structure. For example, a given type of driving event may be modelled as a software class, and each instance of the given driving event may be instantiated as an object of that class.

In an exemplary embodiment, a software class modeling a driver change driving event may be named "DriverChangeEvent" and may include fields such as DriverName (the name of the driver taking control of the vehicle during a driving excursion), DriverID (a unique identification number of the driver), TimeOn and TimeOff (a timestamp indicating when the driver started and stopped driving the vehicle, respectively), and LastTimeOff (a pointer referencing the previous trip or excursion of the driver). Additionally, different events objects may store amounts of data, whose size is defined by the system software standard.

In accordance with an embodiment, every event object, regardless of type, may contain certain useful data. For example, every event object may contain data indicating which stored driving video the event object is associated with (an event object will only be associated with the driving video that was being captured at the time the event was determined). Every event object may contain data indicating the overall size of the object (event objects will vary in size, since each type of event object will contain different data). Further, each event object may contain data indicating a time correspondence with a portion of the captured driving video with which the event object is associated (referred to herein as "video timeline correspondence data").

For instance, an event object representing a speed range (e.g., 50-55 MPH) maintained over a time period (e.g., 5 minutes; referred to herein as a (speed) "bin"; other quantities may be binned, or histogrammed, in a similar fashion) may include a pointer to a place on the timeline of the associated driving video where the vehicle entered the speed range and a pointer to a place on the timeline of the associated video where the vehicle left the speed range. Extended data may summarize the vehicle speed while within the bin, by, for example, the average speed, speed profile shape, speed variance, etc. In another example, a "driver-change" event object may point to a place on the driving video timeline where the driver started driving, and a place where the driver quit driving (for a "driver-change" event object, this may be the entire driving video). Event objects for certain driving events may be configured to include time segments (e.g., multiple image frames) of the driving video either before or after the time point when the actual driving event was determined to have occurred. For instance, the video correspondence data for an event object generated in response to a hard braking episode may include a predefined amount of time or number of frames before and/or after the actual event.

In accordance with an embodiment, video timeline correspondence data may include, for instance, a time stamp indicating the time the driving event that triggered the creation of the corresponding event object was determined. Likewise, each image frame of a driving video may also be associated with a time stamp. The event object may include data associating it with the image frame having the same, or the closest (in time) time stamp as that included in the event object. For event objects generated as a result of a driving event determined from an analysis of driving video, the event object may simply include data associating the event object with the video image frame that produced the data that triggered the driving event that, in turn, triggered the generation of the event object.

Event objects may be serialized to event object index partition 404 such that the structure and state of the object is retained when the object is deserialized from, e.g., non-volatile storage into system memory, in accordance with an embodiment. In some embodiments, event objects may be stored in a relational database in event object index partition 404, using, e.g., object relational mapping. In other embodiments, event objects may be serialized to a flat file architecture stored in event object index partition 404. In still other embodiments, event objects may be maintained in an in-memory data grid in event object index partition 404. In accordance with an embodiment, event object index partition 404 will generally require less storage capacity than traditional storage partition 406, but more than metadata tag index partition 402. Event object index partition 404 may be any size, however, and may include both storage and system memory. Event objects may be stored in event object index partition contiguously ordered by time of generation.

Metadata tag index partition 402 is configured as an index to the event objects stored in event object index partition 404, in accordance with an embodiment. Metadata tag index partition 402 may store metadata tags. Each metadata tag is associated with, and identifies a location of, an event object. Metadata tags may be used to identify event objects without accessing the event object, itself. Accordingly, metadata tags include the type of event object that they are associated with, and a location identifier of the event object that they are associated with. In some embodiments, metadata tags only include data indicating these two pieces of information. In other embodiments, metadata tags may include more or less information. The driving event type of a metadata tag may be bit encoded into a memory location storing the tag, making the tag retrievable via bit masking, and thus avoiding multiple memory reads, in accordance with an embodiment. Because metadata tags generally contain less data than event objects, and much less data than video or audio files, they can be efficiently searched and relevant tags can be quickly returned when queried.

As depicted in FIG. 4, access software 208 can query the DVR memory/storage 400 for video segments using predefined driving event types as parameters of the query. For instance, access software 408 may query DVR memory/storage 400 for all video segments associated with a heavy breaking event. Likewise, access software 408 may query DVR memory/storage 400 for all video segments associated with a particular driver, or heavy acceleration, or any other predefined event object. Metadata tag index partition 402 can be searched for metadata tags that reflect the driving event provided as a parameter in the query.

Once all metadata tags having a driving event type matching the driving event type provided as a parameter in the query have been identified in metadata tag index partition 402, the locations of the event objects that are associated with the identified metadata tags can be determined based on the identified metadata tags (using the pointer to the location of the event object associated with the metadata tag). Then, the event objects found at these locations may be analyzed to identify each event object's respective video timeline correspondence data. Segments of video relevant to the initial query may then be returned to the access software 408 based on the identified video timeline correspondence data identified in each event object that was, in turn, identified by each metadata tag matching the query parameter. In this way, specified driving video segments can be returned to the access software without searching a driving video for a particular segment. In accordance with an embodiment, the video timeline data may be initially returned as the result of the query, in order to build a user-viewable list of the corresponding driving video segments (instead of the video segments, themselves). This allows the user to see and select a driving video segment, and avoids the initial transfer of all driving video segments.

Figure 11:
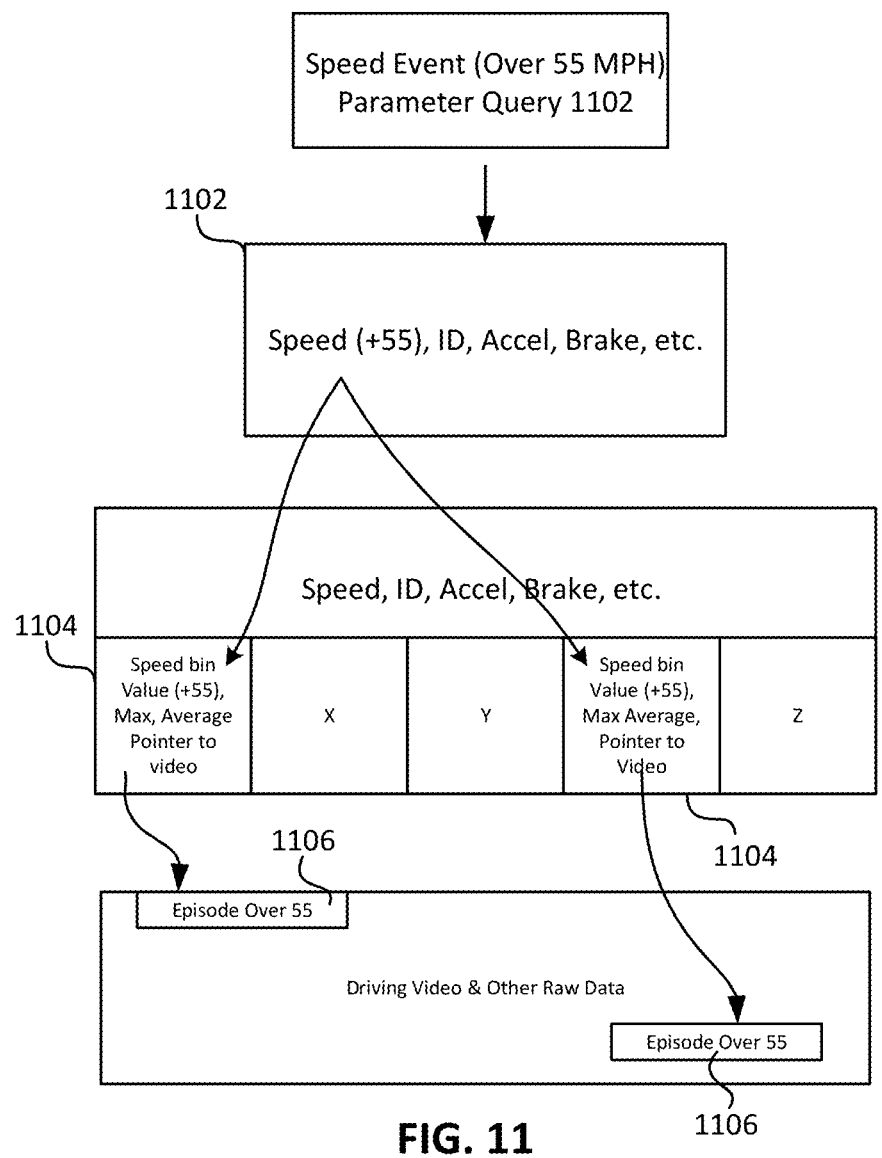
FIG. 11 shows a block diagram of the driving video retrieval process, in accordance with an embodiment.

FIG. 11 shows a block diagram of the driving video retrieval process, in accordance with an embodiment. A user may desire to retrieve all driving video segments that correspond to a specified speed. The user may use the access software to specify over-55-MPH-speed event 1102 as a parameter of a query of the driving oriented DVR system. When the query is submitted to the driving oriented DVR, the DVR searches through the indexed metadata tags 1102 (e.g., in metadata tag index partition 402), which contain only driving event types and further event object locations, for all tags of type over-55-MPH-speed. These tags of type over 55 MPH speed may be scattered among other tag types, e.g., those related to driver identity, vehicle acceleration, brake pressure, etc.

In accordance with an embodiment, the search through the index identifies, based on the metadata tags of type over-55-MPH-speed, the locations (e.g., the memory addresses) of the event objects of type over-55-MPH-speed 1104 (stored in, e.g., event object index partition 404). The identified event objects 1104 contain the value of the speed associated with the determined driving event that the event object was generated in response to. Each event object 1104 contains an association and a pointer to an image frame or frames of a driving video that defines a segment 1106 of the driving video (e.g., in traditional storage partition 406) that corresponds in time to the driving event specified in query (i.e., query 1102). The image frame or frames that comprise the identified segment 1106 are returned to the access software as the result of the query.

In accordance with an embodiment, speed event metadata tags may be simplified to, e.g., 2 or 3 speed ranges. For instance, the query-able parameters regarding speed events may be simplified to low, medium, and high speeds, corresponding to, for example, 0-20, 20-40, and 40-100 mph.

Such a subdivision can make the search more efficient, as a value of between 2 and 3 is most efficient for search speed.

In the event two or more parameters are specified in a query from access software 408, all metadata tags having an event type that matches any of the plurality of event types specified as parameters provided in the query may be identified in metadata tag index partition 402 (each a relevant metadata tag). Then, the locations of the event objects (in event object index partition 404) that are associated with the relevant metadata tags can be determined based on the relevant metadata tags. At this point, an event overlap engine (not shown) can determine, based on the video timeline correspondence data associated with each event object found at a location identified by the relevant metadata tags, video segments identified by the video timeline correspondence data of each of the different event object types that overlap. The determined video timeline correspondence data can then be returned to access software 408 as the results of the initial query. Alternatively, the video segments can then be returned to access software 408 as the results of the initial query.

Figure 5:
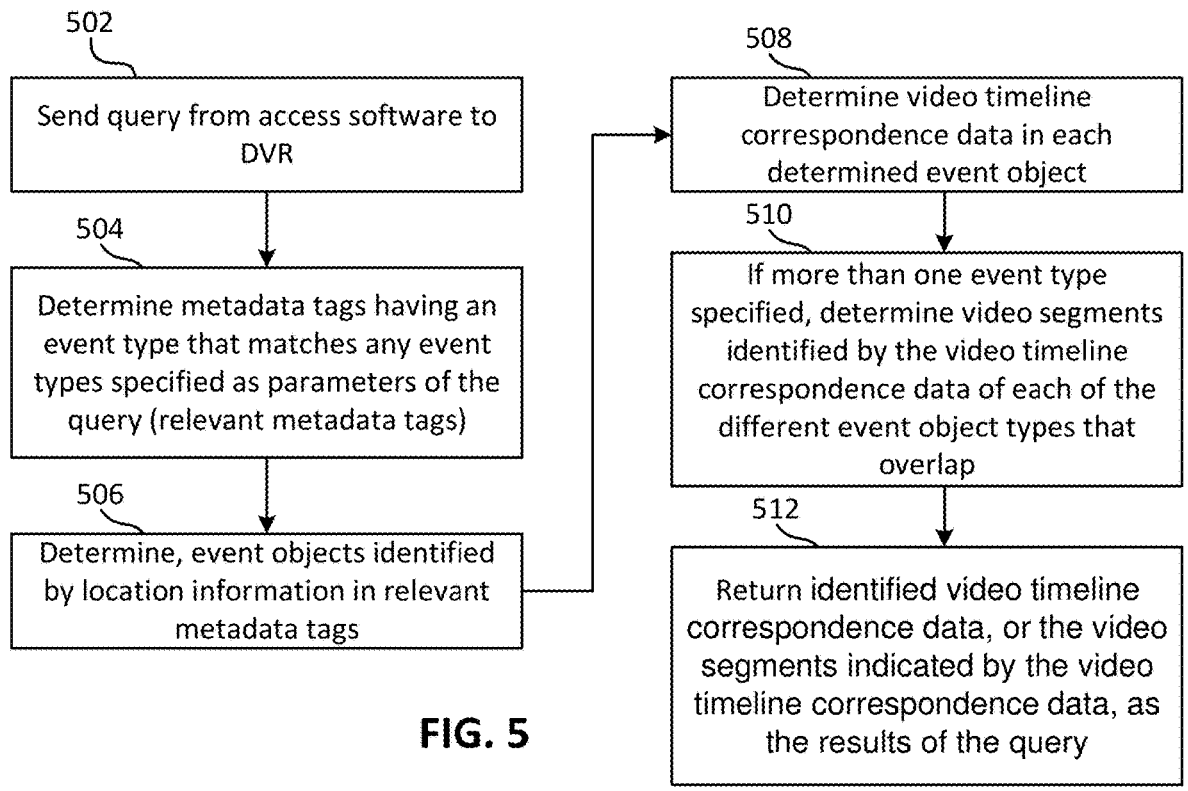
FIG. 5 shows a flow chart for querying a driving oriented DVR, in accordance with an embodiment.

FIG. 5 shows a flow chart for querying a driving oriented DVR and receiving video segments from the driving oriented DVR in response to the query. At step 502, the access software sends a query, including parameters that reflect driving event types, to the DVR. At step 504, the DVR determines metadata tags having a driving event type that matches any driving event types specified as parameters of the query (relevant metadata tags). At step 506, event objects are identified by location information included in the relevant metadata tags. At step 508, video timeline correspondence data included in each determined event object is determined. Step 510 is performed if there is more than one event type specified as a parameter of the query. At step 510, if more than one event type is specified, video segments identified by the video timeline correspondence data of each of the different event object types that overlap are identified. At step 512 the identified video timeline correspondence data, or the video segments indicated by the video timeline correspondence data, are returned as the results of the query.

In accordance with an embodiment, the driving oriented DVR system includes access software (e.g., access software 408) which allows a user of the driving oriented DVR to preview selected segments of the captured driving video by querying the driving oriented DVR using all or a portion of the predefined driving events that the driving oriented DVR may determine to have occurred.

In accordance with an embodiment, the access software may be an application executing on a mobile device, for example, a cellular telephone or a tablet computer. In other embodiments, the access software may execute on any electronic device, such as a desktop computer. The access software may include an application interface, a web page/browser interface, or both. The access software may communicate with the driving oriented DVR via any suitable method. For example, the access software may use WiFi, Bluetooth, near field communication (NFC), or a wired connection to access the driving oriented DVR.

Figure 6A:
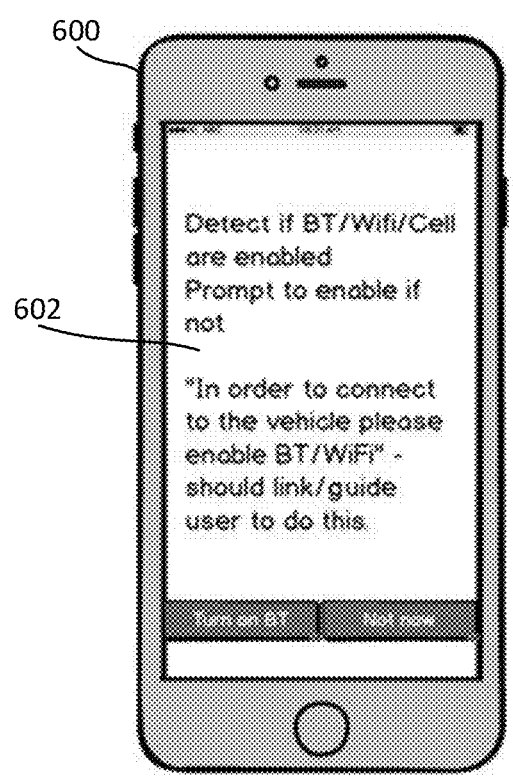
FIGS. 6A-F show illustrations of interface pages of access software for accessing the content of a driving oriented DVR, in accordance with an embodiment.

FIGS. 6A-F show illustrations of interface pages of access software for accessing the content of a driving oriented DVR, in accordance with an embodiment. The access software is shown executing on a mobile device 600. With reference to FIG. 6A, a prompt 602 is depicted on the interface that prompts a user to activate a connection method (in the case of FIG. 6, either a Bluetooth or WiFi connection method) in order to connect to the driving oriented DVR.

Once a connection to the driving oriented DVR is established, a pairing and authorization routine, which authorizes access to the DVR and its contents, takes place before a user is allowed access to the DVR's contents. Any suitable authentication method may be used to authenticate a user of the access software. For example, an LDAP directory containing authorized users and their respective permissions may be employed to authenticate users. Biometric authentication, such as facial recognition, fingerprint recognition, retinal scanning, etc., may be used in conjunction with the user directory.

In accordance with an embodiment, user permissions may reflect specific DVRs that each user has access to, for example, in a fleet environment where many vehicles and corresponding DVRs may be utilized. A user directory for a fleet environment may be a central directory, or there may be a copy on each DVR. Further, a user directory may be replicated to each DVR in the fleet, and changes may be synchronized among the different user directories. In a fleet vehicle environment, where several vehicles each contain a driving oriented DVR system, only certain users (included in the user directory or directories) may have access to certain DVRs.

Once a user has been authenticated by the access software, and a connection to one or more DVRs is established, the access software may provide a list of the one or more DVRs which the access software is in communication with. In accordance with an embodiment, the list may only reflect DVRs that the authenticated user has permission to access. Alternatively, the list may reflect all DVRs in communication with the access software, but only allow a selection of those DVRs that the authenticated user has permission to access.

Figure 6B:
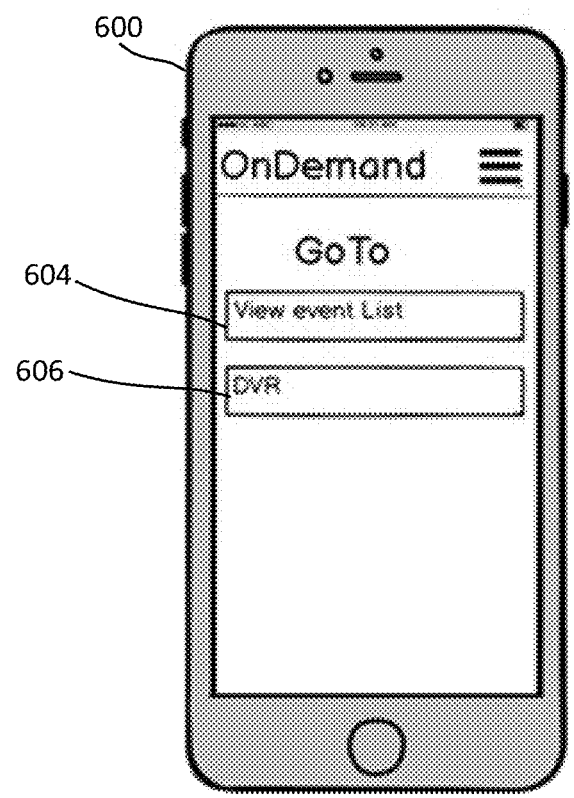

FIG. 6B depicts an example of an interface page of the access software having buttons that allow an authenticated user to view a driving event list, or a list of available DVRs, in accordance with an embodiment. Button 604 may be programmed to produce a list of driving events that the authenticated user may select as parameters for querying a driving oriented DVR for video segments that correspond with the selected driving events. Button 606 may be programmed to produce a list of available DVRs, (e.g., DVRs currently in communication with the access software and the mobile device which the access software executes on, and/or a list of available DVRs that the authenticated user has access to).

Figure 6E:
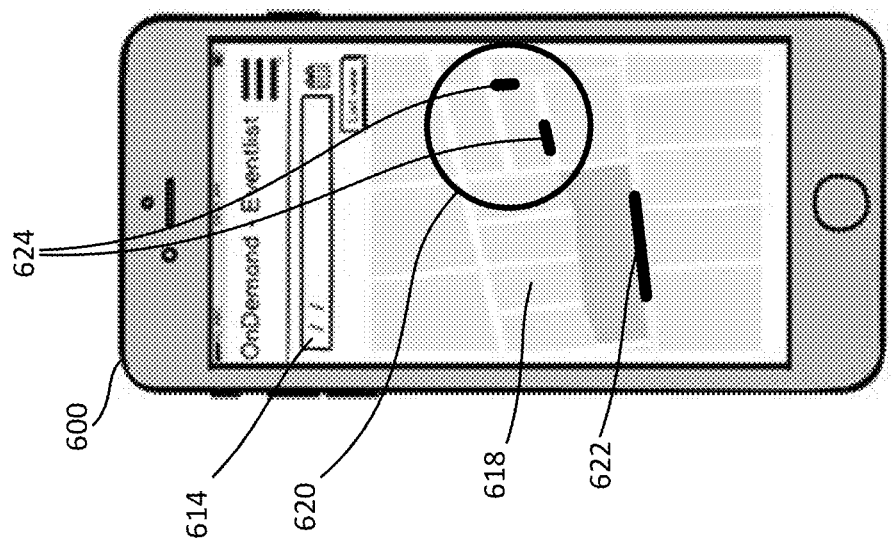
Figure 6D:
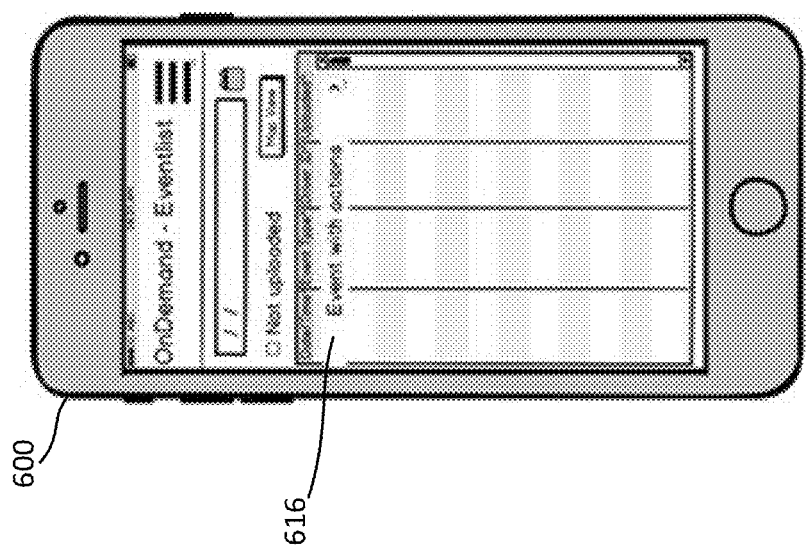
Figure 6C:
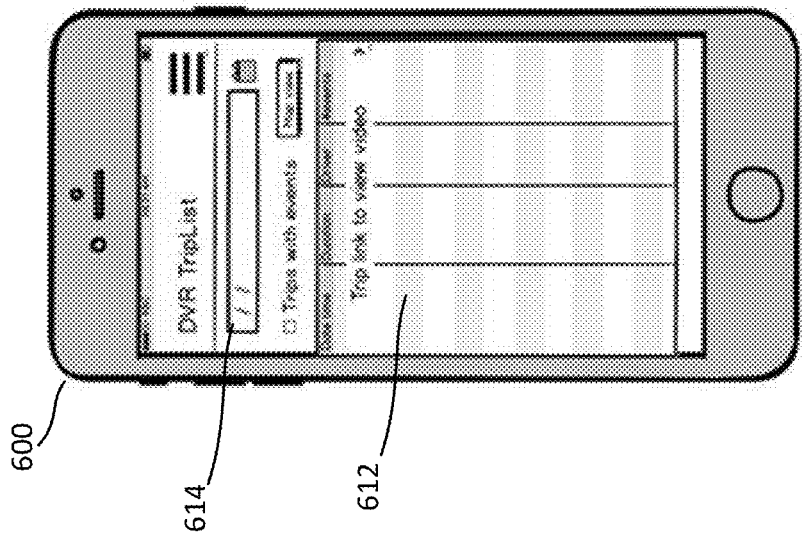

FIG. 6C depicts an example of an interface page of the access software having a list of video segments, in accordance with an embodiment. List 612 may be populated with driving video segments that are the result of a query of a selected driving oriented DVR. The list items may be active links which, when selected, allow the user to view the corresponding video segment (no links are shown in the list 612). Input field 614 may allow an authenticated user to filter the query results by, e.g., date. FIG. 6D depicts a selectable driving video segment 616 in the event list.

FIG. 6E depicts an example of an interface page of the access software having a map 618 from which driving events may be displayed and selected (as query parameters of a DVR query), in accordance with an embodiment. Driving events may be displayed as different colored sections on the streets of the map 618. Further, the different colored sections may be of different lengths, where the length indicates a period of time over which the driving event occurred.

In accordance with an embodiment, selectable map event 622 represents a visualization of, e.g., an over-speed driving event (i.e., a determined period of time during which the driver exceeded a posted speed limit). Selectable map event 622 is indicated by a section of heavily darkened road on the map (in practice, this section may be red, blue, etc., to signify the type of driving event indicated, as discussed above). Further, the length of selectable map event 622 may correspond in length (on the map interface) to the actual section of road where the over-speed event took place (i.e., in real time and space). Selectable map event 622 may be selectable from the map 618, e.g., when touched by a user of the access software. When selected by a user, the selection may add the over-speed event as a parameter of a query of a driving oriented DVR, such that the result of the query returns the segment of the driving video or videos captured during the over-speed event.

With continued reference to FIG. 6E, user selection 620 represents a selection of an area of the interface map 618 by a user of the access software. Selection 620 may be made by a user with, for instance, a stylus, or a finger of the user in embodiments where portable device 600 is equipped with a touch screen. In embodiments where the access software is not executed on a device with a touch screen, a user input device, such as a mouse or keyboard may be used by a user to indicate a selection of the user.

Figure 6F:
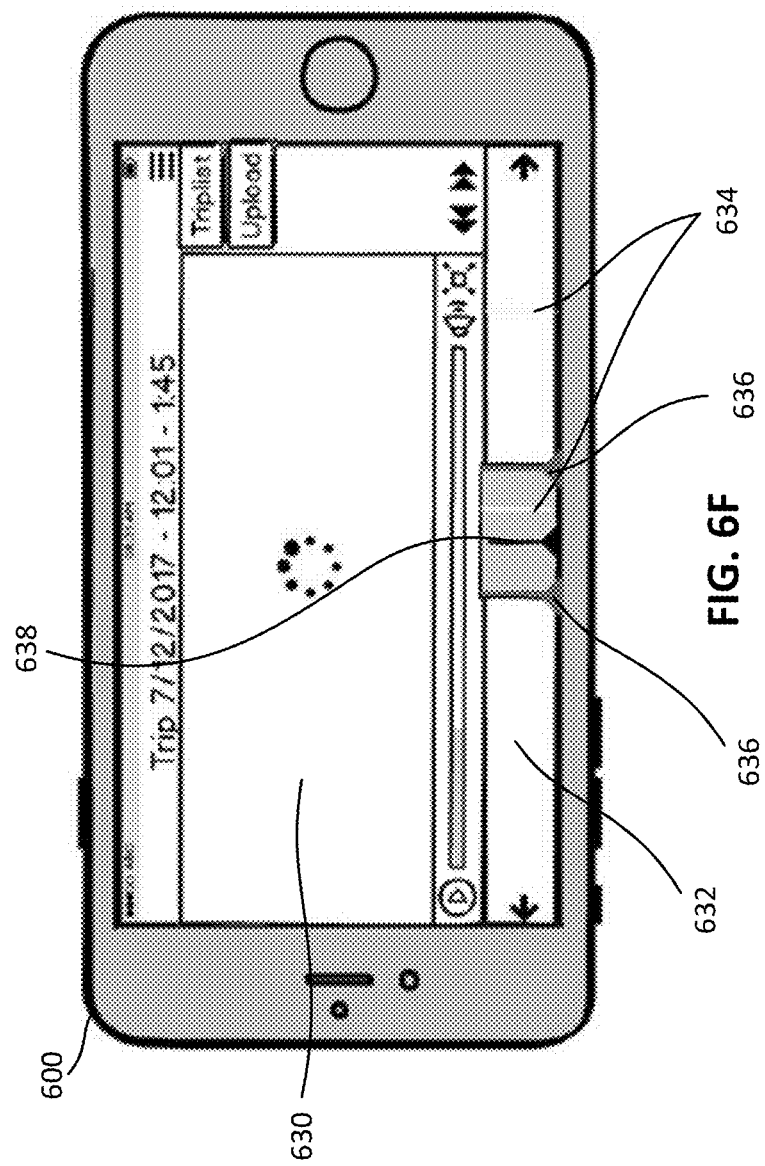

User selection 620 represents an area of interest to the user of the access software. In accordance with an embodiment, any driving events having a correspondence to the area within the boundaries of the user selection (i.e., any driving events determined by the driving oriented DVR system to have happened in the actual area represented by the user-selected area of the map) may be added as a parameter of a query of a driving oriented DVR, such that the result of the query returns the corresponding segment(s) of the driving video that correspond to the driving events within the user selected area of the interface map 618. For instance, driving events 624 may be added to a query of the driving oriented DVR, and the results of the query may include the video segments that correspond to driving events 624. Additionally, driving events may be filtered out of the map by date, or by other criteria, for example, by specifying a date in input field 614, FIG. 6F depicts an example of a video-viewing interface page 630 of the access software. In accordance with an embodiment, a user may select, e.g., selectable driving video segment 616 (depicted in FIG. 6D) to view a segment of video returned as the result of a query of a driving oriented DVR. Upon selection of a selectable driving video segment, the access software may display video viewing interface page 630. Video viewing interface page 630 may include video timeline 632 (for scrolling through the timeline of the returned driving video segment), along with other common controls for playing, stopping, pausing, etc., the driving video. Play position marker 638 may indicate a current position of video playback (i.e., the point on the video timeline that is currently playing, or where play would begin, if playback is not currently in progress).

In another embodiment, position marker 638 may indicate the time a driving event (e.g., strong braking or small time headway, etc.) occurred, and the markers 636 may be bracketing markers 636, and may indicate the start and end of the associated video recording (i.e., strong braking or small time headway are predefined driving event types, where 20-30 seconds of bracketing video is automatically identified in the corresponding event object as part of the event and included in the corresponding video segment identified in the event object). A user may view the 20-30 seconds of video from the start to the end marker.

In accordance with an embodiment, an extended segment of a driving video (or an entire driving video) may be loaded in to video viewing interface page 630. When an extended segment of driving video is loaded into video viewing interface page 630, driving events determined to have occurred within the extended segment can be shown by visual driving event indicators 634. Also, a selection of the video may be made by manipulating visual video segment selection indicators 636. For example, a user of the access software may manipulate visual video segment selection indicators 636, such that a portion of the driving video being displayed in video viewing interface page 630 is selected (e.g., the portion between visual video segment selection indicators 636). The selected portion may then be processed in some manner. For instance, the selected portion may be transferred from the DVR to a more permanent storage, such as a server. Transferring of video is discussed in more detail, below.

In addition to retrieving and viewing relevant segments of driving video based on determined driving events, a user of a driving oriented DVR system may want to store the relevant segments of video on a more permanent storage than that of the driving oriented DVR. In accordance with an embodiment, the access software may facilitate a transfer of all or part of driving video from the driving oriented DVR to a more permanent storage, such as a server.

Figure 7:
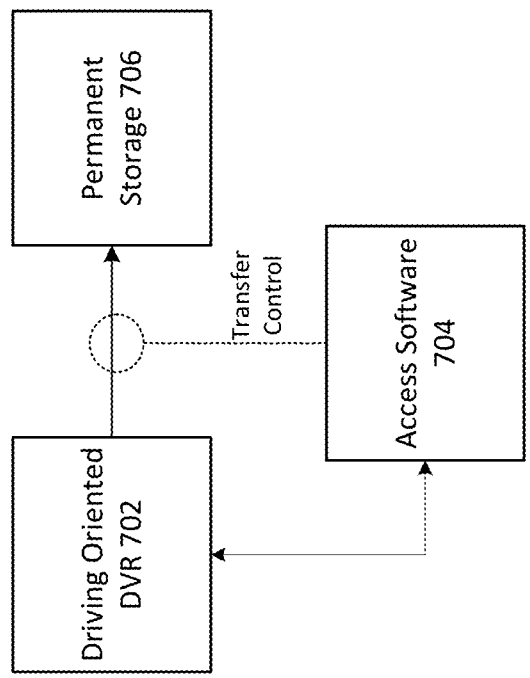
FIG. 7 is a block diagram of a driving oriented DVR system, in accordance with an embodiment.

FIG. 7 is a block diagram of a driving oriented DVR system, in accordance with an embodiment. As shown in FIG. 7, access software 704 may have access to driving oriented DVR 702. As discussed above, driving oriented DVR 702 may store driving data, audio, event objects and metadata tags. Access software 704 may query DVR 702 using predefined driving event types as parameters of the query. DVR 702 may return, in response to the query, video timeline correspondence data indicating segments of driving video, or actual segments of driving video that correspond to determined driving events that match the driving event types provided as parameters of the query.

With continued reference to FIG. 7, a user of access software 704 may desire to permanently store all or some of the video segments returned from DVR 702 to the access software 704. In accordance with an embodiment, access control software 704 controls transfer of the video segments from DVR 702 to permanent storage 706. Access software 704 may provide functionality that facilitates a selection and transfer of segments of driving video from the DVR 702 to permanent storage 706. Permanent storage 706 may be a remote server, in accordance with an embodiment. In one embodiment, the driving video segments may be transferred directly to permanent storage 706 from DVR 702. In another embodiment (not shown), the driving video segments may be transferred from the device executing access software 704 to permanent storage 706 after they are received by access software 704 from DVR 702. In another embodiment (not shown), the start and end locations of the desired video sections may be sent to the permanent storage device, which then retrieves these from the DVR.

Figure 8:
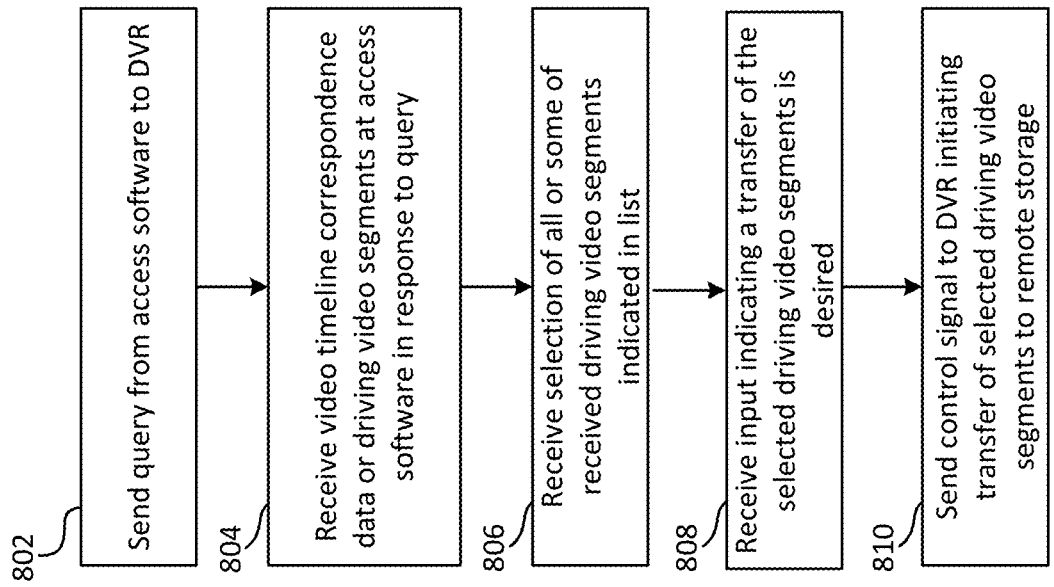
FIG. 8 is a flow chart showing a method for using access software to transfer segments of driving video from a driving oriented DVR to a remote storage, in accordance with an embodiment.

FIG. 8 is a flow chart showing a method for using access software to transfer segments of driving video from a driving oriented DVR to a remote storage, in accordance with an embodiment. At step 802, the access software queries the DVR. At step 804, the access software receives video timeline correspondence data, or actual driving video segments, and builds a list that reflects the driving video segment(s) indicated by the received video timeline correspondence data or the actual driving video segments. At step 806, a selection of all or some of the list items is received by the access software. The selection may be a user selection. At step 808, the access software receives input (e.g., user input) indicating that a transfer of the selected driving video is desired. At step 810, the access software sends a control signal to the DVR to initiate transfer of the selected driving video segments to remote storage. Both push (DVR sends data to permanent storage) and pull (permanent storage pulls identified data from DVR) variations of transfer are possible.

In accordance with an embodiment, providers of a driving oriented DVR system may wish to provide the system and features of the system as a product/service to managers and/or operators of commercial vehicles, including managers of commercial fleet vehicles. Specifically, the driving oriented DVR system may be configured such that monetary charges may be associated with the viewing and/or transferring of segments of captured driving video.

In accordance with an embodiment, a provider of a driving oriented DVR system may install, or have installed, in a commercial vehicle of a third party (e.g., a customer) components of a driving oriented DVR system as discussed above. The provider of the driving oriented DVR system may provide, control, and manage the different components of the driving oriented DVR system. As mentioned above, a user directory may include authorized users of the driving oriented DVR system. The driving oriented DVR system may keep records/logs of use of the system by authorized users. Authorized users may be associated with a business or corporate entity within the system. The system may record in a log when authorized users view or transfer retrieved segments of driving video from the driving oriented DVR. The provider of the driving oriented DVR system may then invoice the business or corporate entity associated with the authorized user that requested to view or transfer driving video in accordance with a billing policy.

In accordance with an embodiment, for viewing of driving video segments, a billing policy may be based on the number of segments viewed. For transferring video segments, the billing policy may be based on the amount of data transferred. For example, a user of the access software may receive five relevant driving video segments in response to a query of the driving oriented DVR. The billing policy of the provider of the DVR may specify that viewing a relevant segment of video costs X dollars per view. If the user views all five received video segments, the system may calculate an invoice due for five times the rate of viewing a video (i.e., "5×$X"). Likewise, the billing policy of the provider may specify that transferring a certain amount of data costs X dollars—for instance the policy may specify that it costs $1 per megabyte to transfer data to permanent storage. Thus, if the user proceeds to transfer a driving video segment to permanent storage that is 20 megabytes in size, the driving oriented DVR may calculate an invoice of $20 for the transfer (i.e., $1×20 MB).

In order to prevent unauthorized access to the driving oriented video from the device executing the access software, the access software may not store the driving video segments on the executing device. In accordance with an embodiment, the access software may stream the video directly from the DVR. In other embodiments, the access software may download the driving video segments for a limited time. The access software may delete the driving video segments when the authenticated user ceases using the access software (e.g., when the user logs out or is logged out of the access software due to time, inactivity, etc.). The access software thus may only view, but not store, video of interest.

In another embodiment, the access software may temporarily store only portions of the driving video segment, the portion being enough to facilitate playback while another portion, contiguous in time with the portion being played back (the first portion), is transferred from the DVR to the access software. When the first portion is done playing back, the next portion may begin playback, and the first portion may be deleted from the device executing the access software.

FIG. 9 is a flow chart for generating an invoice based on usage of a driving oriented DVR system, in accordance with an embodiment. At step 902 a user of the driving oriented DVR system is associated with a business or corporate entity. At step 904, the usage of the system by the user is recorded by the system, e.g., in a log. At step 906, a billing policy is defined for user activity. At step 908, the billing policy is applied to the recorded usage by the user to determine the cost for the recorded usage. At step 910, an invoice is generated, including a cost for the recorded usage.

FIG. 10 is a block diagram of a driving oriented DVR system, in accordance with an embodiment. As discussed above, access software may control the transfer of segments of driving video from the DVR to permanent storage. The permanent storage may be a component of a remote server. As shown in FIG. 10, access software 1004 may have access to driving oriented DVR 1002. Further, access software 1004 may control the transfer of data from DVR 1002 to remote server 1006. Driving video and other data may be transferred directly from DVR 1002 to remote server 1006, or video and other data may be transferred via access control software 1004 to remote server 1006. In accordance with an embodiment, transferred video and audio may be analyzed after it is transferred from the DVR 1002 to the remote server 1006 or the access software 1004 to identify additional driving events.

A video/audio analysis engine 1008 may analyze transferred video. The video/audio analysis engine 1008 may be a standalone system (e.g., a separate server, as shown in FIG. 10), or it may be integrated with remote server 1006, or access software 1004. Video/audio analysis engine 1008 may have components, logic, and/or instructions similar to video/audio analyzing engine 132 (discussed above) and may operate in a similar manner as video/audio analyzing engine 132. Video/audio analysis engine 1008 may process video to determine similar or different driving events as those determined by video/audio analyzing engine 132. Additionally, event objects and metadata tags that correspond with transferred segments of driving video may also be transferred to remote server 1006. Thus, an event object can be updated with additional data about its associated driving event, if any is generated by video/audio analysis engine 1008. Moreover, remote server 1006 may include a memory structure similar to that of memory/storage 400. In this way, transferred event objects and metadata tags can be stored on remote server 1006 as they are in memory storage 400, and new event objects and metadata tags, based on newly generated driving events (based on data generated from video/audio analysis engine 1008) may be stored accordingly on remote server 1006.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

What is claimed:

1. A method of identifying video segments stored on a digital video recorder (DVR) from an access software executing on an electronic device, comprising:
   querying the DVR from the access software, wherein the querying comprises querying the DVR with a query comprising a predefined event type as a parameter;
   receiving, by the access software, a location in a memory device of the DVR of a video segment associated with the predefined event type;
   listing, by the access software, a user-selectable item representing the received video location via a display of the electronic device; and
   receiving, by the access software, a user selection of a user of the user-selectable item.

2. The method of claim 1, comprising:
   in response to receiving the selection of the user-selectable item, initiating a transfer of the video segment at the location represented by the user-selectable item from the DVR to a remote server.

3. The method of claim 2, wherein the transfer transfers the video segment directly to the remote server.

4. The method of claim 2, wherein the transfer transfers the video segment to the electronic device, and wherein the electronic device transfers the video segment to the remote server.

5. The method of claim 1, comprising:
   authenticating, by the access software, the user, wherein the user is associated with a business entity;
   recording the selection of the user-selectable item;
   applying a billing policy to the recorded user selection of the user-selectable item;
   generating an invoice, including a cost based on the billing policy, for the business entity.

6. The method of claim wherein the billing policy is based on a number of video segments viewed by the user.

7. The method of claim 5, wherein the billing policy is based on an amount of data transferred from the DVR.

8. The method of claim 1, comprising:
   in response to receiving the selection of the user-selectable item, displaying, by the access software via the display of the electronic device, a video viewing interface; and
   displaying, in the video viewing interface, the video segment at the location represented by the user-selectable item.

9. The method of claim 8, wherein the video viewing interface includes a timeline of the video, and wherein a first marker indicates a time on the timeline where the predefined event type is recorded.

10. The method of claim 9, wherein the video viewing interface includes second and third markers indicating a period of time before and a period of time after, respectively, the time on the timeline where the predefined event type is recorded.

11. A non-transitory computer-readable medium, having instructions stored thereon for identifying video segments stored on a digital video recorder (DVR), the instructions, when executed by a computer, cause the computer to perform the steps comprising:
    querying the DVR, wherein the querying comprises querying the DVR with a query comprising a predefined event type as a parameter;
    receiving a location in a memory device of the DVR of a video segment associated with the predefined event type;
    listing a user-selectable item representing the received video location via a display of the computer; and
    receiving a selection of the user-selectable item from a user of the computer.

12. The non-transitory computer-readable medium of claim 11, comprising:
    in response to receiving the selection of the user-selectable item, initiating a transfer of the video segment at the location represented by the user-selectable item from the DVR to a remote server.

13. The non-transitory computer-readable medium of claim 12, wherein the transfer transfers the video segment directly to the remote server.

14. The non-transitory computer-readable medium of claim 12, wherein the transfer transfers the video segment to the computer, and wherein the computer transfers the video segment to the remote server.

15. The non-transitory computer-readable medium of claim 11, comprising:
    authenticating the user, wherein the user is associated with a business entity;
    recording the selection of the user-selectable item;
    applying a billing policy to the recorded selection of the user-selectable item;
    generating an invoice, including a cost based on the billing policy, for the business entity.

16. The non-transitory computer-readable medium of claim 15, wherein the billing policy is based on a number of video segments viewed by the user.

17. The non-transitory computer-readable medium of claim 15, wherein the billing policy is based on an amount of data transferred from the DVR.

18. The non-transitory computer-readable medium of claim 11, comprising:
    in response to receiving the selection of the user-selectable item, displaying, via the display of the computer, a video viewing interface; and
    displaying, in the video viewing interface, the video segment at the location represented by the user-selectable item.

19. The non-transitory computer-readable medium of claim 18, wherein the video viewing interface includes a timeline of the video, wherein a first marker indicates a time on the timeline where the predefined event type is recorded, and wherein the video viewing interface includes second and third markers indicating a period of time before and a period of time after, respectively, the time on the timeline where the predefined event type is recorded.

20. An electronic device for identifying video segments stored in a memory device of an associated digital video recorder (DVR), the electronic device comprising:
    a memory storing an access software; and
    a processor, wherein the processor executes the access software to:
      query the associated DVR, wherein the querying comprises querying the DVR with a query comprising a predefined event type as a parameter;
      receive a location in the memory device of the associated DVR of a video segment associated with the predefined event type;
      list a user-selectable item representing the received video location via a display of the electronic device; and receive a selection of the user-selectable item from a user of the electronic device.

\* \* \* \* \*